(12) United States Patent
Namiki et al.

(10) Patent No.: US 8,487,067 B2
(45) Date of Patent: Jul. 16, 2013

(54) POLYCARBONATE RESIN AND TRANSPARENT FILM FORMED THEREFROM

(71) Applicants: Shingo Namiki, Fukuoka (JP); Masanori Yamamoto, Fukuoka (JP)

(72) Inventors: Shingo Namiki, Fukuoka (JP); Masanori Yamamoto, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/686,097

(22) Filed: Nov. 27, 2012

(65) Prior Publication Data

US 2013/0085254 A1    Apr. 4, 2013

Related U.S. Application Data

(63) Continuation of application No. PCT/JP2011/062261, filed on May 27, 2011.

(30) Foreign Application Priority Data

May 27, 2010    (JP) ................. 2010-121982

(51) Int. Cl.
*C08G 64/00*    (2006.01)
*C08G 63/02*    (2006.01)

(52) U.S. Cl.
USPC ........................................ 528/196; 528/198

(58) Field of Classification Search
USPC ................................. 528/196, 198
See application file for complete search history.

(56) References Cited

U.S. PATENT DOCUMENTS

| | | |
|---|---|---|
| 2011/0034646 A1 | 2/2011 | Fuji et al. |
| 2012/0232243 A1 | 9/2012 | Namiki et al. |

FOREIGN PATENT DOCUMENTS

| | | |
|---|---|---|
| JP | 10-101786 | 4/1998 |
| JP | 2004-067990 | 3/2004 |
| JP | 2008-111047 | 5/2008 |
| JP | 2010-134232 | 6/2010 |
| JP | 2010-230832 | 10/2010 |
| JP | 2011-111614 | 6/2011 |
| WO | 2006/041190 | 4/2006 |
| WO | 2010/064721 | 6/2010 |
| WO | 2010/071079 | 6/2010 |

OTHER PUBLICATIONS

International Search Report issued Jun. 21, 2011 in PCT/JP2011/062261 filed May 27, 2011.

*Primary Examiner* — Terressa Boykin
(74) *Attorney, Agent, or Firm* — Oblon, Spivak, McClelland, Maier & Neustadt, L.L.P.

(57) ABSTRACT

A polycarbonate resin which is excellent in terms of optical properties, hue, thermal stability, and mechanical properties and a transparent film formed from the resin are provided. The invention relates to a polycarbonate resin which has a glass transition temperature of 110-150° C. and a reduced viscosity, as measured at 20° C. with respect to the methylene chloride solution having a concentration of 0.6 g/dL, of 0.30-0.46, and which, when being molded, gives a film wherein the ratio of the retardation thereof measured at a wavelength of 450 nm (Re450) to the retardation thereof measured at a wavelength of 550 nm (Re550) is 0.50-0.93.

30 Claims, 1 Drawing Sheet

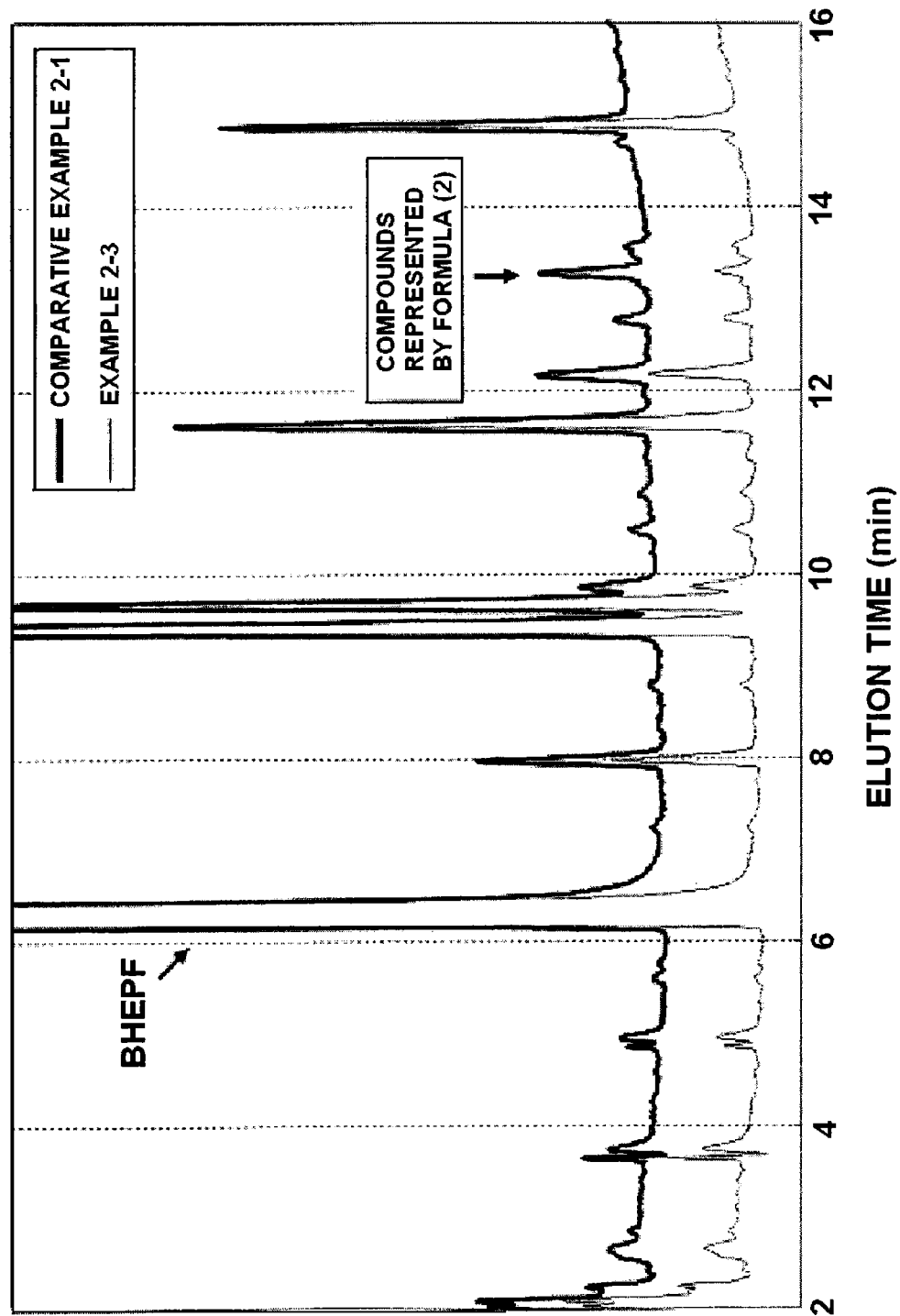

POLYCARBONATE RESIN AND TRANSPARENT FILM FORMED THEREFROM

TECHNICAL FIELD

The present invention relates to a polycarbonate resin which is excellent in terms of optical properties, hue, and thermal stability and to a transparent film formed from the resin.

BACKGROUND ART

Polycarbonate resins are generally produced using bisphenols or the like as monomer ingredients, and are in extensive use as so-called engineering plastics in the fields of electrical/electronic parts, automotive parts, medical parts, building materials, films, sheets, bottles, optical recording media, lenses, etc. so as to take advantage of the superiority thereof concerning transparency, heat resistance, mechanical strength, etc.

Recently, polycarbonate resins induced from a dihydroxy compound having a fluorene ring as a side chain have been reported.

Patent document 1 describes a polycarbonate resin having excellent optical properties which has been produced using a bisphenol compound having a fluorene ring as a side chain and 2,2-bis(4-hydroxyphenyl)propane. Patent document 2 describes a polycarbonate resin which has a low photoelastic coefficient and has been produced using a bisphenol compound having a fluorene ring as a side chain, pentacyclodecanedimethanol, and isosorbide. Patent document 3 describes a polycarbonate resin produced using a dihydroxy compound having a fluorene ring as a side chain, tricyclodecanedimethanol, and isosorbide. Furthermore, patent document 4 discloses that a retardation film made of such a polycarbonate resin which contains fluorene rings not only has a low photoelastic coefficient but also shows reverse wavelength dispersion characteristics, i.e., the property of decreasing in phase retardation as the wavelength decreases, and that a polycarbonate which is useful in optical applications including retardation films is hence obtained.

In the case where a polycarbonate resin is to be produced using a dihydroxy compound having alcoholic hydroxyl groups, such as the dihydroxy compound having a fluorene ring as a side chain or isosorbide, or the like as a starting material, the resin usually is produced by a method called a transesterification process or a melt process. According to this method, polycarbonate resins have been obtained by subjecting the dihydroxy compound to transesterification with a carbonic diester, e.g., diphenyl carbonate, at a high temperature in the presence of a basic catalyst and removing the resultant by-product phenol from the system to thereby cause the polymerization to proceed.

In recent years, the technique of film formation by melt extrusion, in which films are formed without using a solvent, has come to be employed in order to more efficiently produce molded articles which are thin and have a large area, such as films. Resins for use in this technique are required to have melt processability, and various copolymer compositions have been proposed from this standpoint (see, for example, patent document 5 to patent document 8).

PRIOR-ART DOCUMENTS

Patent Documents

Patent Document 1: JP-A-10-101786
Patent Document 2: JP-A-2004-67990
Patent Document 3: International Publication No. 2006/041190
Patent Document 4: JP-A-2008-111047
Patent Document 5: International Publication No. 2010/064721
Patent Document 6: International Publication No. 2010/071079
Patent Document 7: JP-A-2010-134232
Patent Document 8: JP-A-2010-230832

SUMMARY OF THE INVENTION

Problems that the Invention is to Solve

However, the polycarbonate resins proposed hitherto have the following drawbacks although the resins have excellent optical properties according to the patent documents, etc. When a higher processing temperature is used in order to ensure the flowability of those resins because the resins have an exceedingly high molecular weight, the elevated temperature results in film coloration or in appearance failures due to scorching, silver streaking, etc. On the other hand, when the processing temperature is lowered, this may pose a problem that the resin has too high a melt viscosity, making it difficult to regulate the film thickness.

Meanwhile, polycarbonate resins obtained using a dihydroxy compound having ether bonds in the molecule, such as isosorbide, have poor thermal stability as compared with polycarbonate resins obtained using a monomer having phenolic hydroxyl groups, e.g., bisphenol A. There have hence been cases where the former polycarbonate resins take a color during the polymerization or molding, when the resins are exposed to a high temperature. Furthermore, polycarbonate resins produced using, as a starting material, a dihydroxy compound having a fluorene ring generally have a high melt viscosity, making it difficult to lower the polymerization temperature or lower the processing temperature. It has hence been difficult to inhibit these polycarbonate resins from taking a color.

In the field of transparent films including optical films, e.g., retardation films for use in recent liquid-crystal display devices, mobile appliances, etc., there is a need for a material which has higher orientation characteristics, i.e., a material which gives a film that attains a large phase retardation even when thin, as a result of thickness reductions in appliances. In the case of a resin having a reduced molecular weight, sufficient toughness is not obtained, making it difficult to obtain high orientation characteristics through a film-stretching operation. In such cases in which sufficient orientation characteristics are not obtained, it is necessary that the thickness of the film should be increased for causing the film to show a given phase retardation. There have hence been cases where such a film is not usable in thin appliances.

An object of the invention is to eliminate the conventional problems described above and to provide a polycarbonate resin which is excellent in terms of optical properties, mechanical properties, hue, and thermal stability and a transparent film formed from the resin.

Means for Solving the Problems

The present inventors diligently made investigations in order to overcome the problems. As a result, the inventors have found that a polycarbonate resin which has specific values of glass transition temperature, reduced viscosity, and ratio between the retardations measured at specific wavelengths is excellent in terms of optical properties, mechanical properties, hue, and thermal stability. The invention has been thus achieved.

Namely, essential points of the invention reside in the following [1] to [22].

[1] A polycarbonate resin which has a glass transition temperature of 110-150° C. and a reduced viscosity, as measured at 20° C. with respect to the methylene chloride solution having a concentration of 0.6 g/dL, of 0.30-0.46, and which, when being molded, gives a film wherein the ratio (Re450/Re550) of the retardation thereof measured at a wavelength of 450 nm (Re450) to the retardation thereof measured at a wavelength of 550 nm (Re550) is 0.50-0.93.

[2] The polycarbonate resin according to [1] wherein the ratio (Re450/Re550) of the retardation of the film of the polycarbonate resin measured at a wavelength of 450 nm (Re450) to the retardation thereof measured at a wavelength of 550 nm (Re550) is 0.50-0.90.

[3] The polycarbonate resin according to [1] or [2] which has a melt viscosity, as measured at a temperature of 240° C. and a shear rate of 91.2 sec$^{-1}$, of 1,500-3,500 Pa·s.

[4] The polycarbonate resin according to any one of [1] to [3] which has a photoelastic coefficient of $40 \times 10^{-12}$ Pa$^{-1}$ or less.

[5] The polycarbonate resin according to any one of [1] to [4] which has a birefringence of 0.001 or higher when stretched in a stretch ratio of 2.0 by fixed-end stretching under the conditions of a temperature which is higher by 15° C. than the glass transition temperature of the polycarbonate resin.

[6] The polycarbonate resin according to any one of [1] to [5] which contains a structural unit derived from a dihydroxy compound represented by the following formula (1).

[Chem. 1]

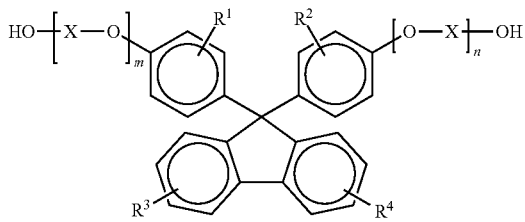

(1)

In the formula (1), $R^1$ to $R^4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, $R^1$ to $R^4$ being the same or different atoms and groups respectively as the four substituents bonded to the respective benzene rings; X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms; and m and n each independently are an integer of 0-5.

[7] The polycarbonate resin according to [6] which is a polycarbonate resin that contains a structural unit derived from a dihydroxy compound represented by the formula (1) and in which the total content of compounds represented by the following formula (2) is up to 400 ppm of the dihydroxy compound.

[Chem. 2]

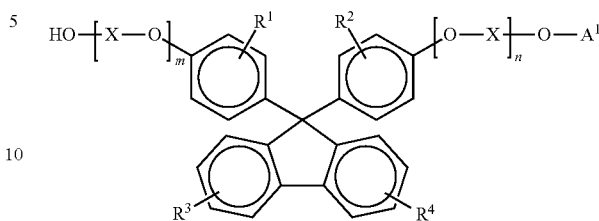

(2)

In the formula (2), $R^1$ to $R^4$, X, m, and n are the same as in the formula (1), and $A^1$ represents an optionally substituted aliphatic group having 1-18 carbon atoms or an optionally substituted aromatic group having 6-18 carbon atoms.

[8] The polycarbonate resin according to [6] or [7] which contains a structural unit derived from a dihydroxy compound having the portion represented by the following formula (3) as part of the structure thereof, besides a structural unit derived from the dihydroxy compound represented by the formula (1).

[Chem. 3]

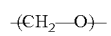

(3)

The case where the portion represented by the formula (3) is a portion which constitutes part of —CH$_2$—OH is excluded.

[9] The polycarbonate resin according to [8] wherein the dihydroxy compound having the portion represented by the formula (3) is a compound which has both a cyclic structure and an ether structure.

[10] The polycarbonate resin according to [8] or [9] wherein the dihydroxy compound having the portion represented by the formula (3) as part of the structure thereof is a dihydroxy compound represented by the following formula (4).

[Chem. 4]

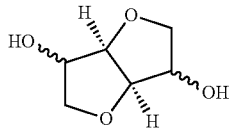

(4)

[11] The polycarbonate resin according to any one of [1] to [10] which contains a carbonic diester represented by the following formula (5) in an amount of 80 weight ppm or less.

[Chem. 5]

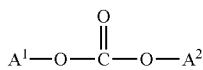

(5)

In the formula (5), $A^1$ and $A^2$ each independently represent an optionally substituted aliphatic group having 1-18 carbon atoms or an optionally substituted aromatic group having 6-18 carbon atoms, and $A^1$ and $A^2$ may be the same or different.

[12] The polycarbonate resin according to any one of [1] to [11] which contains an aromatic monohydroxy compound in an amount of 700 weight ppm or less.
[13] The polycarbonate resin according to any one of [1] to [12] wherein the total content of sodium, potassium, and cesium in the polycarbonate resin is 1 μmol or less per mole of the structural units each derived from a dihydroxy compound which constitute the polycarbonate resin.
[14] The polycarbonate resin according to any one of [1] to [13] wherein when the total sulfur element content per mole of the structural units each derived from a dihydroxy compound which constitute the polycarbonate resin, in the polycarbonate resin, is expressed by A [μmol] and the total content of the Group-1 metallic elements and Group-2 metallic elements of the long-form periodic table per mole of the structural units each derived from a dihydroxy compound which constitute the polycarbonate resin, in the polycarbonate resin, is expressed by B [μmol], then the ratio of B to A (B/A) is 2 or less.
[15] The polycarbonate resin according to any one of [7] to [14] wherein when the total content of compounds represented by the formula (2) based on the structural units derived from a dihydroxy compound represented by the formula (1), in the polycarbonate resin, is expressed by a [ppm] and the total amount of the Group-1 metals and Group-2 metals of the long-form periodic table which are contained in the polycarbonate per mole of the structural units derived from a dihydroxy compound represented by the formula (1), in the polycarbonate, is expressed by b [μmol], then the proportion of a to b (a/b) is 20 or less.
[16] The polycarbonate resin according to any one of [6] to [15] which contains one or more compounds of at least one metal selected from the group consisting of lithium and the Group-2 metals of the long-form periodic table, the amount of the compounds being 0.5-50 μmol per mole of the structural units which are derived from a dihydroxy compound represented by the formula (1) and are contained in the polycarbonate resin.
[17] The polycarbonate resin according to any one of [1] to [16] which is characterized by further containing a constituent unit derived from at least one compound selected from the group consisting of aliphatic dihydroxy compounds, alicyclic dihydroxy compounds, oxyalkylene glycols, and diols having a cyclic acetal structure.
[18] The polycarbonate resin according to any one of [11] to [17] which has been obtained by subjecting one or more dihydroxy compounds comprising a dihydroxy compound represented by the formula (1) to melt polycondensation with a carbonic diester represented by the formula (5).
[19] The polycarbonate resin according to any one of [1] to [18] wherein the dihydroxy compounds from which the structural units that constitute the polycarbonate resin are derived each are a dihydroxy compound which has a boiling point at 5 kPa of 200° C. or higher.
[20] A polycarbonate resin obtained by subjecting a dihydroxy-compound mixture comprising a dihydroxy compound represented by the following formula (1) and a dihydroxy compound having the portion represented by the following formula (3) as part of the structure thereof to polycondensation with a carbonic diester represented by the following formula (5) in the presence of a catalyst, characterized in that the catalyst comprises one or more compounds which contain at least one metal selected from the group consisting of lithium and the Group-2 metals of the long-form periodic table, and that the total content of the Group-1 metallic elements and Group-2 metallic elements of the long-form periodic table, in the polycarbonate resin, is 20 μmol or less per mole of the structural units each derived from a dihydroxy compound which constitute the polycarbonate resin.

[Chem. 6]

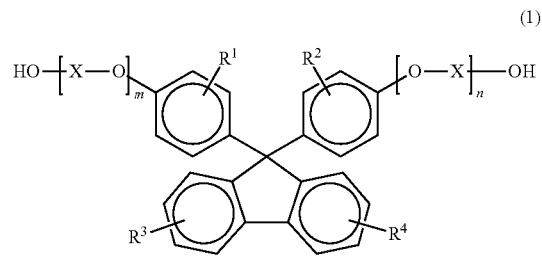

(1)

In the formula (1), $R^1$ to $R^4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, $R^1$ to $R^4$ being the same or different atoms or groups respectively as the four substituents bonded to the respective benzene rings; X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms; and m and n each independently are an integer of 0-5.

[Chem. 7]

(3)

The case where the portion represented by the formula (3) is a portion which constitutes part of —CH$_2$—OH is excluded.

[Chem. 8]

(5)

In the formula (5), $A^1$ and $A^2$ each independently represent an optionally substituted aliphatic group having 1-18 carbon atoms or an optionally substituted aromatic group having 6-18 carbon atoms, and $A^1$ and $A^2$ may be the same or different.
[21] A transparent film formed from the polycarbonate resin according to any one of [1] to [20].
[22] The film according to [21] which is a film obtained by stretching the transparent film at least unidirectionally.
[23] The film according to [21] or [22] wherein the ratio (Re450/Re550) of the retardation thereof measured at a wavelength of 450 nm (Re450) to the retardation thereof measured at a wavelength of 550 nm (Re550) is 0.5-0.93.
[24] The film according to [21] or [22] wherein the ratio (Re450/Re550) of the retardation thereof measured at a wavelength of 450 nm (Re450) to the retardation thereof measured at a wavelength of 550 nm (Re550) is 0.5-0.90.
[25] The film according to any one of [21] to [24] which has a photoelastic coefficient of $40 \times 10^{-12}$ Pa$^{-1}$ or less.

Effects of the Invention

According to the invention, it is possible to provide a polycarbonate resin which not only has excellent optical properties but also is excellent in terms of hue and thermal stability and which is applicable to a wide range of fields including the field of injection molding for producing electrical/electronic parts, automotive parts, and the like, the field of films and sheets, the fields of bottles and containers, lens applications such as camera lenses, finder lenses, and lenses for CCDs or CMOSs, films or sheets for use in liquid-crystal or plasma displays or the like, such as retardation films, diffusion sheets, and polarizing films, optical disks, optical materials, optical parts, and binder applications for fixing pigments, charge transfer agents, or the like.

BRIEF DESCRIPTION OF THE DRAWING

FIG. 1 is a drawing which shows an LC chart obtained when the total amount of compounds represented by the formula (2) contained in a polycarbonate resin of the invention was determined by LC analysis.

MODES FOR CARRYING OUT THE INVENTION

Embodiments of the invention will be explained below in detail. The following explanations on constituent elements are for embodiments (representative embodiments) of the invention, and the invention should not be construed as being limited to the embodiments unless the invention departs from the spirit thereof. In the invention, "weight" has the same meaning as "mass". The polycarbonate resins of the invention include the resins which contain not only a polymer having a polycarbonate structure but also various compounds that generated when the polymer was produced, and further include the resins obtained by incorporating various additives, etc. into the polymer.

The polycarbonate resin of the invention is a polycarbonate resin which has a glass transition temperature of 110-150° C. and a reduced viscosity, as measured at 20° C. with respect to the methylene chloride solution having a concentration of 0.6 g/dL, of 0.30-0.46, and which, when being molded, gives a film wherein the ratio of the retardation thereof measured at a wavelength of 450 nm (Re450) to the retardation thereof measured at a wavelength of 550 nm (Re550) is 0.50-0.93.
<Properties of the Polycarbonate Resin>
(Glass Transition Temperature)

The polycarbonate resin of the invention has a glass transition temperature of 110-150° C. In case where the glass transition temperature of the polycarbonate resin is too low, this polycarbonate resin is insufficient in heat resistance, which is necessary in use environments, and there is the possibility that the polycarbonate resin might undergo a decrease in transparency or a dimensional change through molding. In addition, there is the possibility that when this polycarbonate resin is used as an optical film, this optical film might be unable to retain the optical properties, for example, because relaxation of the molecular chains occur. Consequently, the glass transition temperature thereof is more preferably 115° C. or higher, even more preferably 120° C. or higher.

On the other hand, in case where the glass transition temperature of the polycarbonate resin is too high, it is impossible to obtain sufficient mechanical properties. In case where the molecular weight of such a polycarbonate resin is heightened in order to enhance mechanical properties, this usually results also in an increase in melt viscosity. In such cases, it is necessary to elevate the temperature to be used for producing the polycarbonate resin and to elevate the temperature to be used for molding the resin, and such elevated temperatures may result in coloration or pyrolysis of the polycarbonate resin. Consequently, the glass transition temperature thereof is more preferably 148° C. or lower, even more preferably 146° C. or lower.

The glass transition temperature thereof can be regulated, for example, by regulating the kind of the repeating structural units which constitute the polycarbonate resin, or by producing the polycarbonate resin as a copolymer, or by regulating the copolymerization ratio of repeating structural units in the case of a copolymer. Glass transition temperature can be measured by the method which will be described in the Example later.
(Reduced Viscosity)

The polycarbonate resin of the invention has a reduced viscosity, as measured at 20° C. with respect to the methylene chloride solution having a concentration of 0.6 g/dL, of 0.30-0.46. In case where the reduced viscosity thereof is too low, this polycarbonate resin has reduced mechanical properties. In case where the polycarbonate resin has thus decreased, for example, in toughness or the like, it is difficult to mold the resin into an object having a small thickness, such as a film, or to stretch the thin object. Consequently, the reduced viscosity thereof is more preferably 0.33 or higher, even more preferably 0.35 or higher.

On the other hand, in case where the reduced viscosity thereof is too high, this polycarbonate resin shows reduced flowability when being molded, and this tends to reduce productivity and moldability. In addition, there is the possibility that this polycarbonate resin might give, through melt processing, a molded article which has silver streaks, foreign matter due to scorching, etc., resulting in appearance failures. Furthermore, when the melt processing is conducted using an extruder, it is difficult to inhibit the increase in resin temperature due to shear heating, even when the barrel temperature of the extruder is kept low. There are hence cases where silver streaks, foreign matter due to scorching, etc. generate or a decrease in the molecular weight of the polycarbonate resin results. Consequently, the reduced viscosity thereof is preferably 0.43 or less, more preferably 0.41 or less.

It is preferred that the ratio of the reduced viscosity of a molded object obtained through melt molding to the reduced viscosity of the polycarbonate resin which has not been molded should be 0.95 or greater. The reduced viscosity of a polycarbonate is determined by preparing a solution thereof using methylene chloride as a solvent so as to precisely regulate the polycarbonate concentration to 0.6 g/dL and measuring the viscosity thereof at a temperature of 20.0±0.1° C. using an Ubbelohde viscometer.

The reduced viscosity of the polycarbonate resin can be regulated by heightening the molecular weight of the polycarbonate resin or by introducing a branched structure into the polycarbonate resin.
(Retardation)

The polycarbonate resin of the invention is useful as optical compensation films to be used for viewing angle improvement, prevention of external-light reflection, color compensation, conversion of linearly polarized light to circularly polarized light, etc. especially in various displays (liquid-crystal display devices, organic EL display devices, plasma display devices, field emission display (FED) devices, and surface electric field display (SED) devices). When the polycarbonate resin is for use in this application, it is preferred that in a film obtained by molding the polycarbonate resin, the ratio (Re450/Re550) of the retardation thereof measured at a wavelength of 450 nm (Re450) to the retardation thereof measured at a wavelength of 550 nm (Re550) is 0.50-0.93. The ratio (Re450/Re550) is more preferably 0.70-0.91, especially preferably 0.85-0.90.

So long as the ratio is within that range, ideal retardation characteristics can be obtained at each wavelength within the visible region. For example, by producing a retardation film having such a wavelength dependence as a quarter-wave plate and laminating this retardation film to a polarizing plate, a circularly polarizing plate or the like can be produced. Thus, a polarizing plate and a display device which have a small wavelength dependence of hue are rendered possible. On the other hand, in case where that ratio is outside the range shown above, the wavelength dependence of hue is enhanced and the optical compensation at all wavelengths within the visible region is not performed, resulting in problems of coloration, a decrease in contrast, and the like which are due to light passing through the polarizing plate or display device.

The retardation of the polycarbonate resin can be regulated, for example, by regulating the kind of the repeating structural units which constitute the polycarbonate resin, or by producing the polycarbonate resin as a copolymer, or by regulating the copolymerization ratio of repeating structural units in the case of a copolymer.

(Birefringence)

It is preferred that the retardation film should further have a retardation within a suitable range. The retardation of a film is determined by the product of the birefringence of the film and the thickness thereof. It is therefore preferred that in order for a film to be thin while retaining a given retardation, this film should have a high birefringence. The polycarbonate resin of the invention, when stretched in a stretch ratio of 2.0 by fixed-end stretching under the conditions of (glass transition temperature)+15° C., has a birefringence of preferably 0.001 or higher, more preferably 0.0015 or higher, especially preferably 0.0020 or higher.

In case where the birefringence thereof is less than 0.001, it is necessary to excessively increase the thickness of the film, resulting in an increase in the amount of the material to be used. It is hence difficult to regulate the film so as to attain homogeneity with respect to thickness, transparency, and retardation. Because of this, in case where a transparent film produced from the polycarbonate resin has a birefringence less than 0.001, there is the possibility that this transparent film cannot be applied to appliances which are required to be accurate, thin, and homogeneous. On the other hand, in case where the thickness of the film is too small, problems concerning handling arise. Consequently, the birefringence thereof is preferably 0.010 or less, more preferably 0.008 or less.

The birefringence is determined by the intrinsic birefringence, which depends on the molecular structure of the polycarbonate resin, and by processing conditions such as stretch ratio and stretching temperature. It is preferred that a dihydroxy compound which has a structure that shows strong polarization along the main-chain direction should be used for constituting the polycarbonate resin. Furthermore, for improving stretchability, it is important to introduce a flexible structure into the polycarbonate resin to regulate the glass transition temperature and melt viscosity described above to values within suitable ranges.

(Photoelastic Coefficient)

It is preferred that the polycarbonate resin of the invention should have a photoelastic coefficient of $40 \times 10^{12}$ $Pa^{-1}$ or less. The photoelastic coefficient thereof is more preferably $35 \times 10^{-12}$ $Pa^{-1}$ or less, especially preferably $30 \times 10^{-12}$ $Pa^{-1}$ or less. In case where the photoelastic coefficient thereof is higher than $40 \times 10^{-12}$ $Pa^{-1}$, there is the possibility that when the transparent film is laminated as a retardation film to a polarizing plate and this polarizing plate is mounted on a display device, then local stress might be imposed on the retardation film by the influence of the viewing environment or the heat of the backlight as a result of the stress imposed during the laminating, and that an uneven change in retardation might hence occur, resulting in a decrease in image quality such as white fogging which occurs at the periphery of the screen. This problem is serious especially when the retardation film is used in large display devices.

(Melt Viscosity)

From the standpoints of the mechanical properties and color tone of the polycarbonate resin, flowability thereof during melt polymerization or molding, etc., the polycarbonate resin must have a melt viscosity regulated to a value within a suitable range. In case where the melt viscosity thereof is too high, this polycarbonate resin necessitates a high processing temperature although improved in mechanical property. It is therefore difficult to inhibit this resin from taking a color or being pyrolyzed.

The melt viscosity of the polycarbonate resin of the invention is measured using Capilograph. The melt viscosity thereof measured at a temperature of 240° C. and a shear rate of 91.2 $sec^{-1}$ is preferably 1,500-3,500 Pa·s, more preferably 2,000-3,000 Pa·s.

<Polycarbonate Resin>

It is preferred that the polycarbonate resin of the invention should contain a structural unit derived from a dihydroxy compound represented by the following formula (1).

[Chem. 9]

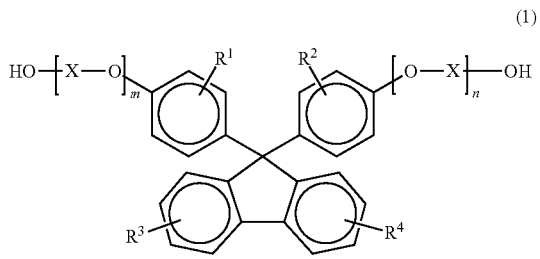

(1)

In the formula (1), $R^1$ to $R^4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, $R^1$ to $R^4$ being the same or different atoms or groups respectively as the four substituents bonded to the respective benzene rings; X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms; and m and n each independently are an integer of 0-5.

When the polycarbonate resin contains a structural unit derived from a dihydroxy compound represented by the formula (1), it is easy to render the optical properties thereof, such as a moderate retardation, retardation ratio, birefringence, and low photoelastic coefficient, and the material properties thereof, such as heat resistance and mechanical strength, more preferred.

The polycarbonate resin of the invention may be produced by any process. However, in the case where the resin is produced using a dihydroxy compound having alcoholic hydroxyl groups as a starting material, it is preferred that this dihydroxy compound should be used as a starting material to conduct melt polycondensation by means of a transesterification reaction. It is hence preferred that the polycarbonate resin of the invention should be produced by subjecting the dihydroxy compound and a carbonic diester as starting materials to polycondensation by means of a transesterification reaction.

(Dihydroxy Compound)

Preferred of the dihydroxy compounds represented by the formula (1) (hereinafter often referred to as "fluorene-based dihydroxy compounds") are dihydroxy compounds in which m and n each are 1. This is because such dihydroxy compounds impart excellent mechanical properties and heat resistance.

Examples of the compounds in which m=1 and n=1 include 9,9-bis(4-(2-hydroxyethoxy)phenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene.

Most preferred of the fluorene-based dihydroxy compounds is 9,9-bis(4-(2-hydroxyethoxy)phenyl)fluorene, from the standpoints of availability and ease of production. Those dihydroxy compounds may be used alone or in combination of two or more thereof in accordance with the performances required of the polycarbonate resin to be obtained.

There is the possibility that the compounds represented by the formula (1) might contain a sulfur compound which came thereinto during the production of the compounds, and there are cases where the sulfur compound exerts an adverse influence on the step of polymerization for polycarbonate production. Consequently, the sulfur element content in the compounds is preferably 20 ppm or less, more preferably 10 ppm or less, even more preferably 5 ppm or less. The fluorene-based dihydroxy compounds have so high a boiling point that it is difficult to purify the dihydroxy compounds by distillation. In general, the dihydroxy compounds are purified by washing with water, recrystallization, and use of an ion-exchange resin, activated carbon, etc. The total amount of sulfur contained can be determined by ion chromatography.

It is preferred that the polycarbonate of the invention should contain structural units derived from one or more dihydroxy compounds other than the dihydroxy compounds represented by the formula (1), from the standpoint of regulating the polycarbonate so as to have desired optical properties. In this case, the proportion of the structural unit derived from a dihydroxy compound represented by the formula (1) to all structural units each derived from a dihydroxy compound is preferably 25-80% by mole, more preferably 30-70% by mole, especially preferably 35-60% by mole.

Use of a dihydroxy compound which has the portion represented by the following formula (3) as part of the structure thereof (specific dihydroxy compound) is suitable for enabling the polycarbonate to combine optical properties, such as a moderate birefringence and a low photoelastic coefficient, and material properties, such as heat resistance and mechanical strength. Examples thereof include oxyalkylene glycols, dihydroxy compounds having an ether bond bonded to an aromatic group, and dihydroxy compounds having a cyclic ether structure.

[Chem. 10]

However, the case where the portion represented by the formula (3) is a portion which constitutes part of —CH$_2$—OH is excluded.

Examples of the oxyalkylene glycols include diethylene glycol, triethylene glycol, tetraethylene glycol, polyethylene glycol, and polypropylene glycol.

Examples of the dihydroxy compounds having an ether group bonded to an aromatic group include 2,2-bis(4-(2-hydroxyethoxy)phenyl)propane, 2,2-bis(4-(2-hydroxypropoxy)phenyl)propane, 1,3-bis(2-hydroxyethoxy)benzene, 4,4'-bis(2-hydroxyethoxy)biphenyl, and bis(4-(2-hydroxyethoxy)phenyl sulfone.

Examples of the dihydroxy compounds having a cyclic ether structure include the dihydroxy compounds represented by the following formula (4) and the spiro glycols represented by the following formula (6) or following formula (7). The term "cyclic ether structure" in the expression "dihydroxy compounds having a cyclic ether structure" means a structure which includes a cyclic structure that has an ether group therein and in which the carbon atoms constituting the cyclic chain are aliphatic carbon atoms.

[Chem. 11]

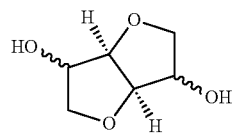

[Chem. 12]

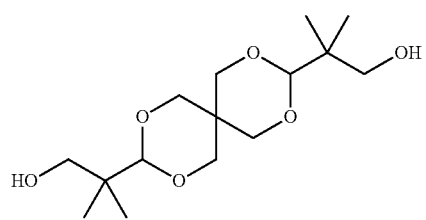

[Chem. 13]

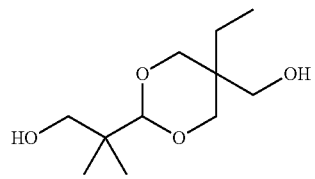

Examples of the dihydroxy compounds represented by the formula (4) include isosorbide (ISB), isomannide, and isoidide, which are stereoisomers. These compounds may be used alone or in combination of two or more thereof.

Of the dihydroxy compounds shown above, the dihydroxy compounds having a cyclic ether structure which are represented by the dihydroxy compounds represented by the formulae (4), (6), and (7) are preferred from the standpoints of availability, handling, reactivity during polymerization, and the hue of the polycarbonate to be obtained. More preferred are the dihydroxy compounds represented by the formula (4) and dihydroxy compounds having two cyclic ether structures, e.g., the spiro glycol represented by the formula (7). Especially preferred are anhydrous sugar alcohols which are sugar-derived dihydroxy compounds having two cyclic ether structures, such as the dihydroxy compounds represented by the formula (4).

From the standpoint of the optical properties of the polycarbonate, it is preferred to use dihydroxy compounds having no aromatic ring structure, among those specific dihydroxy compounds. Most preferred of these are the anhydrous sugar alcohols, e.g., the dihydroxy compounds represented by the formula (4), that are obtained by the dehydrating condensation of sorbitol, which is produced from various starches that are plant-derived abundant resources and are easily available, from the standpoints of availability, ease of production, light resistance, optical properties, moldability, heat resistance, and carbon neutrality.

Those specific dihydroxy compounds may be used alone or in combination of two or more thereof in accordance with the performances required of the polycarbonate to be obtained.

The dihydroxy compound having the bond structure of the formula (3) may contain stabilizers such as, for example, a reducing agent, antioxidant, deoxidizer, light stabilizer, antacid, pH stabilizer, and heat stabilizer. Since the specific dihydroxy compound according to the invention is apt to alter especially under acidic conditions, it is preferred that the dihydroxy compound should contain a basic stabilizer.

Examples of the basic stabilizer include the hydroxides, carbonates, phosphates, phosphites, hypophosphites, borates, and fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide, amine compounds such as diethylamine, dibutylamine, triethylamine, morpholine, N-methylmorpholine, pyrrolidine, piperidine, 3-amino-1-propanol, ethylenediamine, N-methyldiethanolamine, diethylethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline, and hindered amine compounds such as di(tert-butyl)amine and 2,2,6,6-tetramethylpiperidine. Preferred of these stabilizers from the standpoint of stabilization effect are tetramethylammonium hydroxide, imidazole, and hindered amine stabilizers.

There are no particular limitations on the content of these basic stabilizers in the dihydroxy compounds. However, since the dihydroxy compounds having the structure represented by the formula (4) which are usable in the invention are unstable when in an acidic state, it is preferred to add any of those stabilizers thereto so that an aqueous solution of the dihydroxy compounds which contain the stabilizer has a pH of 7 or higher. In case where the amount thereof is too small, there is the possibility that the effect of preventing the specific dihydroxy compounds from altering might not be obtained. Meanwhile, too large amounts thereof may result in cases where the fluorene-based dihydroxy compound or the specific dihydroxy compounds alter during the polymerization reaction. Consequently, the content thereof is generally 0.0001-1% by weight, preferably 0.001-0.1% by weight, based on each dihydroxy compound to be used in the invention.

Furthermore, the specific dihydroxy compounds having the structure represented by the formula (4) are apt to be gradually oxidized by oxygen. It is therefore important to prevent water inclusion during storage or during handling for production in order to prevent the decomposition caused by oxygen. It is also important to use a deoxidizer or to use a nitrogen atmosphere. Isosorbide, upon oxidation, generates decomposition products including formic acid. For example, when isosorbide which contains those decomposition products is used for polycarbonate production, there are cases where not only the decomposition products render the resultant polycarbonate colored and considerably deteriorate the properties thereof but also the decomposition products affect the polymerization reaction to make it impossible to obtain a polymer having a high molecular weight. Use of such isosorbide hence is undesirable.

The polycarbonate of the invention may contain structural units derived from dihydroxy compounds (hereinafter often referred to as "other dihydroxy compounds") other than the fluorene-based dihdyroxy compound and specific dihydroxy compound described above. Examples of the other dihydroxy compounds include dihydroxy compounds of linear aliphatic hydrocarbons, dihydroxy compounds of branched aliphatic hydrocarbons, dihydroxy compounds of alicyclic hydrocarbons, and aromatic bisphenol compounds.

Examples of the dihydroxy compounds of linear aliphatic hydrocarbons include ethylene glycol, 1,3-propanediol, 1,2-propanedil, 1,4-butanediol, 1,3-butanediol, 1,2-butanediol, 1,5-heptanediol, 1,6-hexanediol, 1,10-decanediol, and 1,12-dodecanediol.

Examples of the dihydroxy compounds of branched aliphatic hydrocarbons include neopentyl glycol and hexylene glycol.

Examples of the dihydroxy compounds of alicyclic hydrocarbons include 1,2-cyclohexanediol, 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, 1,3-adamantanedimethanol, and dihydroxy compounds derived from terpene compounds, e.g., limonene.

Examples of the aromatic bisphenol compounds include 2,2-bis(4-hydroxyphenyl)propane, 2,2-bis(4-hydroxy-3,5-dimethylphenyl)propane, 2,2-bis(4-hydroxy-3,5-diethylphenyl)propane, 2,2-bis(4-hydroxy(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, and 4,4'-dihydroxy-3,3'-dichlorodiphenyl ether.

With respect to those other dihydroxy compounds also, one of the compounds may be used in combination with the specific dihydroxy compound or a combination of two or more of those other dihydroxy compounds may be used in combination with the fluorene-based dihydroxy compound or with the specific dihydroxy compound, in accordance with the performances required of the polycarbonate to be obtained. Preferred of those other dihydroxy compounds, from the standpoint of the optical properties of the polycarbonate, are the dihydroxy compounds which have no aromatic structure in the molecular structure, i.e., the dihydroxy compounds of aliphatic hydrocarbons and the dihydroxy compounds of alicyclic hydrocarbons. These two kinds of compounds may be used in combination.

Especially preferred among the dihydroxy compounds of aliphatic hydrocarbons, which are suitable for the polycarbonate of the invention, are the dihydroxy compounds of linear aliphatic hydrocarbons which each have 3-6 carbon atoms and have a hydroxyl group at each end, e.g., 1,3-propanediol, 1,4-butanediol, 1,5-pentanediol, and 1,6-hexanediol.

Especially preferred dihydroxy compounds of alicyclic hydrocarbons are 1,2-cyclohexanedimethanol, 1,3-cyclohexanedimethanol, 1,4-cyclohexanedimethanol, and tricyclodecanedimethanol. More preferred are the dihydroxy compounds having a cyclohexane structure, such as 1,2-cyclohexanedimethanol, 1,3-cyclohexanedimethanol, and 1,4-cyclohexanedimethanol.

In case where a polycarbonate resin of the invention is produced by melt polymerization using a dihydroxy compound having a low boiling point as a reactant, part of this dihydroxy compound is distilled off from the reaction system without being reacted, because the reaction is conducted at a high temperature and a high vacuum as will be described later. As a result, it becomes difficult to control the composition regarding copolymerization of the polycarbonate resin to be obtained.

The polycarbonate resin of the invention can be improved in properties including optical properties and mechanical properties by controlling the copolymerization ratio of a plurality of dihydroxy compounds. Consequently, the copolymerization ratio of the dihydroxy compounds to be subjected to the reaction is easier to control when the dihydroxy compounds have a higher boiling point and are less apt to be distilled off. In the case of the polycarbonate resin of the invention, it is preferred that all the dihydroxy compounds for constituting the polycarbonate resin each should have a boiling point at 5 kPa of 200° C. or higher.

(Carbonic Diester)

It is preferred that the polycarbonate of the invention should be obtained from starting materials which include one or more dihydroxy compounds including a dihydroxy compound represented by the formula (1) and a carbonic diester, by subjecting the starting materials to polycondensation by means of a transesterification reaction.

Examples of the carbonic diester to be used usually include carbonic diesters represented by the following formula (5). One of these carbonic diesters may be used alone, or a mixture of two or more thereof may be used.

[Chem. 14]

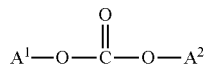

(5)

$A^1$ and $A^2$ each independently represent an optionally substituted aliphatic group having 1-18 carbon atoms or an optionally substituted aromatic group having 6-18 carbon atoms, and $A^1$ and $A^2$ may be the same or different.

Examples of the carbonic diesters represented by the formula (5) include diphenyl carbonate (DPC), substituted diphenyl carbonates, e.g., ditolyl carbonate, dimethyl carbonate, diethyl carbonate, and di-t-butyl carbonate. Preferred are diphenyl carbonate and substituted diphenyl carbonates. Especially preferred is diphenyl carbonate. Incidentally, there are cases where carbonic diesters contain impurities such as chloride ions and where the impurities inhibit the polymerization reaction or impair the hue of the polycarbonate to be obtained. It is therefore preferred that a carbonic diester which has been purified by, for example, distillation should be used according to need.

(Polymerization Catalyst)

As described above, the polycarbonate of the invention may be produced by subjecting one or more dihydroxy compounds including a fluorene-based dihydroxy compound and a carbonic diester represented by the formula (5) to a transesterification reaction. More specifically, the polycarbonate is obtained by subjecting the starting materials to transesterification and removing the by-product monohydroxy compound, etc. from the system. When this transesterification reaction is performed, polycondensation is conducted in the presence of a transesterification reaction catalyst. The transesterification reaction catalyst (hereinafter often referred to simply as catalyst or polymerization catalyst) which can be used when the polycarbonate of the invention is produced can exert a serious influence on the reaction rate and the color tone of the polycarbonate to be obtained through the polycondensation.

The catalyst to be used is not limited so long as the catalyst enables the polycarbonate produced therewith to satisfy transparency, hue, heat resistance, thermal stability, and mechanical strength. Examples thereof include compounds of metals belonging to the Group 1 or Group 2 of the long-form periodic table (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound.

Examples of the Group-1 metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A. Preferred of these are the lithium compounds, from the standpoints of activity in polymerization and the hue of the polycarbonate to be obtained.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Preferred of these are the magnesium compounds, the calcium compounds, and the barium compounds. From the standpoints of activity in polymerization and the hue of the polycarbonate to be obtained, the magnesium compounds and/or the calcium compounds are more preferred.

Although it is possible to use a basic compound, such as a basic boron compound, basic phosphorus compound, basic ammonium compound, or amine compound, as an auxiliary together with any of the Group-1 metal compounds and/or Group-2 metal compounds, it is especially preferred to use a Group-1 metal compound and/or a Group-2 metal compound only.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methyl imidazole, aminoquinoline, and guanidine.

The amount of the polymerization catalyst to be used is generally 0.1-300 μmol, preferably 0.5-100 μmol, per mole of all dihydroxy compounds subjected to the polymerization. Especially in the case where use is made of one or more compounds containing at least one metal selected from the group consisting of the Group-2 metals of the long-form periodic table and from lithium, in particular, in the case where a magnesium compound and/or a calcium compound is used, the amount of this catalyst is generally 0.1 μmol or more, preferably 0.3 μmol or more, especially preferably 0.5 μmol or more, in terms of metal amount per mole of all dihydroxy compounds. The suitable upper limit thereof is generally 40 μmol, preferably 30 μmol, more preferably 20 μmol.

It is, however, noted that there are cases where the specific dihydroxy compound represented by the formula (1) according to the invention contains sulfur which is derived, for example, from a catalyst used for the production. There are cases where the sulfur deactivates the polymerization catalyst. There are hence cases where it is necessary to actually use the polymerization catalyst in an amount larger than that range.

When the total sulfur element content per mole of all dihydroxy compounds to be subjected to the reaction is expressed by P [μmol] and the metal element amount in the polymerization catalyst is expressed by Q [μmol], then it is preferred that the ratio of Q to P (Q/P) should be 0.1-2. Likewise, in the polycarbonate resin of the invention, when the total sulfur element content per mole of all dihydroxy compounds is expressed by A [μmol] and the total content of the Group-1 metallic elements and Group-2 metallic elements of the long-form periodic table is expressed by B [μmol], then it is preferred that the ratio of B to A (B/A) should be 0.1-2.

In case where the catalyst is used in too small an amount, the rate of polymerization becomes low and, hence, the polymerization temperature must be elevated accordingly in order to obtain a polycarbonate having a desired molecular weight. There is hence the high possibility that the polycarbonate thus obtained might have an impaired hue. In addition, there is the possibility that an unreacted starting material might volatilize during the polymerization to change the molar proportions of the dihydroxy compounds and the carbonic diester, making it impossible to attain a desired molecular weight. On the other hand, in case where the polymerization catalyst is used in too large an amount, there is the possibility that undesirable side reactions might occur to give a polycarbonate resin which has an impaired hue or which takes a color when being molded.

Metal ingredients contained in the polycarbonate resin can be causative of coloring of the resin during the polymerization reaction or during molding. Such metal ingredients include not only a metal ingredient derived from the polymerization catalyst described above but also metal ingredients which have come from starting materials, the reactor, or the environment. Consequently, it is necessary that the dihydroxy compounds and carbonic diester to be used for producing the polycarbonate resin of the invention should have been sufficiently purified and that the inclusion of metal ingredients during the steps of polycarbonate production should be avoided.

The content of the Group-2 metals and lithium in the polycarbonate resin of the invention, per mole of the fluorene-based dihydroxy compound, is preferably 50 μmol or less, more preferably 30 μmol or less, especially preferably 20 μmol or less. From the standpoint of adding the polymerization catalyst in a minimum amount in order to cause the polymerization to proceed, the lower limit thereof may be 0.1 mol, and is more preferably 0.5 μmol.

There is the possibility that when sodium, potassium, and cesium, among the Group-1 metals, are contained in the polycarbonate in a large amount, these metals might adversely affect the hue. These metals do not come only from the catalyst used but may come from starting materials and the reactor. Irrespective of the source, the total amount of compounds of those metals in the polycarbonate, per mole of the fluorene-based dihydroxy compound, is desirably 1 μmol or less, preferably 0.5 μmol or less, in terms of metal amount.

(Compounds having Specific Structure)

It is preferred that the polycarbonate resin of the invention should be a polycarbonate resin which contains compounds represented by the following formula (2) in a total amount of 400 ppm or less.

[Chem. 15]

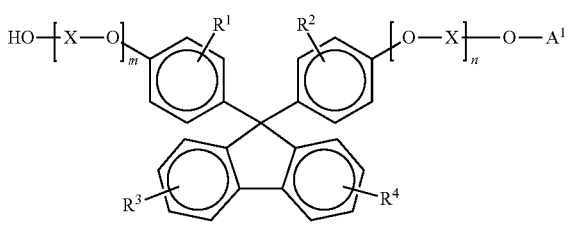

(2)

In the formula (2), $R^1$ to $R^4$, X, m, and n are the same as in the formula (1), and $A^1$ represents an optionally substituted aliphatic group having 1-18 carbon atoms or an optionally substituted aromatic group having 6-18 carbon atoms.

$A^1$ usually frequently has the same structure as the $A^1$ of the carbonic diester represented by the formula (5). For example, in the case where a carbonic diester in which $A^1$ was different from $A^2$ was used, the compounds represented by the formula (2) are constituted of a plurality of compounds. In this case, it is preferred that the total amount of these compounds should be 400 ppm or less of the structures in the polycarbonate resin of the invention which are derived from the dihydroxy compound represented by the formula (1).

Furthermore, when the total amount of the compounds represented by the formula (2) based on the structures in the polycarbonate resin which are derived from the dihydroxy compound represented by the formula (1) is expressed by a [ppm] and the total content of the Group-1 metals and Group-2 metals which are contained in the polycarbonate resin per mole of the structures derived from the dihydroxy compound represented by the formula (1) is expressed by b [μmol], then it is preferred that the ratio of a to b (a/b) should be 20 or less. The a/b ratio is more preferably 15 or less, especially preferably 12 or less. This is because by regulating the a/b ratio to 20 or less, a polycarbonate resin having a better color tone and better thermal stability can be obtained.

The amount of metals contained in a polycarbonate resin is determined by ICP-MS. The metal amount, etc. based on the structures in a polycarbonate resin which are derived from the dihydroxy compound represented by the formula (1) can be calculated from the content of dihydroxy compounds in the polycarbonate resin and the total amount of compounds represented by the formula (2), the content and the total amount being determined by liquid chromatography.

<Production Process>

The polycarbonate resin of the invention can usually be obtained by subjecting one or more dihydroxy compounds and a carbonic diester represented by the formula (5) to polycondensation by means of a transesterification reaction in the presence of a catalyst.

Furthermore, it is preferred that the polycarbonate resin of the invention should be a polycarbonate resin which is obtained by subjecting dihydroxy compounds including a dihydroxy compound represented by the formula (1) and a dihydroxy compound having the portion represented by the formula (3) as part of the structure thereof and a carbonic diester represented by the formula (5) to polycondensation in the presence of a catalyst that is a compound containing at least one metal selected from the group consisting of lithium and the Group-2 metals of the long-form periodic table, and in which the total content of the Group-1 metallic elements and Group-2 metallic elements of the long-form periodic table in the polycarbonate resin is 20 μmol or less per mole of the dihydroxy compounds that constitute the polycarbonate resin.

In this case, it is preferred that the dihydroxy compounds and carbonic diester used as starting materials should be evenly mixed prior to the transesterification reaction.

The temperature at which the starting materials are evenly mixed is generally 80° C. or higher, preferably 90° C. or higher, and the upper limit thereof is generally 250° C., preferably 200° C., more preferably 150° C. Especially suitable is 100-120° C. In case where the mixing temperature is too low, there is the possibility that the rate of dissolution might be too low or the solubility might be insufficient, often resulting in troubles such as solidification. When too high a mixing temperature is used, there are cases where the dihydroxy compounds deteriorate thermally and there is the possibility that the resultant polycarbonate resin might have an impaired hue.

It is preferred, from the standpoint of preventing hue deterioration, that an operation for mixing the dihydroxy compounds and the carbonic diester represented by the formula (5) should be conducted in an atmosphere having an oxygen concentration of 10% by volume or less, preferably 0.0001-10% by volume, more preferably 0.0001-5% by volume, in particular 0.0001-1% by volume.

It is preferred that for obtaining the resin of the invention, the carbonic diester represented by the formula (5) should be used in such an amount that the molar proportion thereof to the dihydroxy compounds to be subjected to the reaction is 0.90-1.20. The molar proportion thereof is more preferably 0.95-1.10.

In case where the molar proportion thereof is too low, the polycarbonate resin produced has an increased amount of terminal hydroxyl groups. This polymer may have impaired thermal stability or take a color upon molding. In addition, there is the possibility that the rate of the transesterification reaction might decrease or a desired high-molecular polymer might not be obtained.

Meanwhile, when the molar proportion thereof is too high, there are cases where the rate of the transesterification reaction decreases or it is difficult to produce a polycarbonate having a desired molecular weight. The decrease in transesterification reaction rate enhances heat history during the polymerization reaction, resulting in the possibility that the polycarbonate resin thus obtained might have an impaired hue.

Furthermore, when the molar proportion of the carbonic diester represented by the formula (5) to the dihydroxy compounds is too high, there are cases where the resultant polycarbonate resin contains an increased amount of the residual carbonic diester and this residual carbonic diester is causative of an odor during molding or results in an increased amount of mold deposits. Such too high proportions of the carbonic diester are hence undesirable.

The concentration of the carbonic diester remaining in the polycarbonic resin of the invention is preferably 80 weight ppm or less, more preferably 70 weight ppm or less, especially preferably 60 weight ppm or less. Actually, the polycarbonate resin may contain unreacted carbonic diesters. The lower limit of the concentration thereof is generally 1 weight ppm.

In the invention, a process in which the dihydroxy compounds are condensation-polymerized with the carbonic diester is conducted in the presence of the catalyst described above usually in multiple stages using a plurality of reactors. The mode of reaction operation may be any of the batch type, the continuous type, and a combination of the batch type and the continuous type.

It is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. However, from the standpoints of stably carrying out the reaction and of hue, it is important that a jacket temperature, an internal temperature, and an internal pressure of the system should be suitably selected for each molecular-weight stage. For example, in case where either temperature or pressure is changed before the polymerization reaction reaches a given value, an unreacted monomer is distilled off to change the molar ratio of the dihydroxy compounds to the carbonic diester. Consequently, there are cases where the rate of polymerization decreases or a polymer having a given molecular weight or having given end groups is not obtained.

To provide a polymerization reactor with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used. However, the temperature of the coolant being introduced into the reflux condenser, as measured at the inlet of the reflux condenser, is preferably 45-180° C., more preferably 80-150° C., especially preferably 100-130° C.

In case where the temperature of the coolant being introduced into the reflux condenser is too high, the amount of the monomers being refluxed decreases, resulting in a decrease in the effect of the refluxing. In case where the temperature thereof is too low, the efficiency of the removal by distillation of the monohydroxy compound to be removed by distillation tends to decrease. As the coolant, use may be made, for example, of hot water, steam, a heat-medium oil, or the like. Preferred is steam or a heat-medium oil.

The selection of the kind and amount of a catalyst described above is important for maintaining a suitable polymerization rate and inhibiting the monomers from being distilled off and for simultaneously enabling the finally obtained polycarbonate resin to have intact properties such as hue and thermal stability.

It is preferred that the polycarbonate resin of the invention should be produced by polymerizing the starting materials in multiple stages using a catalyst and a plurality of reactors. The reasons why the polymerization is conducted in a plurality of reactors are as follows. In the initial stage of the polymerization reaction, since the monomers are contained in a large amount in the liquid reaction mixture, it is important that the monomers should be inhibited from volatilizing off while maintaining a necessary polymerization rate. In the late stage of the polymerization reaction, it is important to sufficiently remove the by-product monohydroxy compound by distillation in order to shift the equilibrium to the polymerization side. From the standpoint of thus setting different sets of polymerization reaction conditions, it is preferred to use a plurality of polymerization reactors arranged serially, from the standpoint of production efficiency.

The number of reactors to be used in the process according to the invention is not limited so long as the number thereof is at least 2 as described above. From the standpoints of production efficiency, etc., the number thereof is preferably 3 or more, more preferably 3-5, especially preferably 4.

In the invention, the process may be conducted in various manners so long as two or more reactors are used. For example, a plurality of reaction stages differing in conditions are formed in any of the reactors, or the temperature and the pressure may be continuously changed in any of the reactors.

In the invention, the polymerization catalyst can be introduced into a starting-material preparation tank or a starting-material storage tank, or can be introduced directly into a polymerization vessel. However, from the standpoints of stability of feeding and polymerization control, a catalyst supply line is disposed somewhere in a starting-material line before a polymerization vessel, and the catalyst is supplied preferably in the form of an aqueous solution. With respect to polymerization reaction temperature, too low temperatures result in a decrease in productivity and cause the product to undergo an enhanced heat history. Too high temperatures not only result in monomer volatilization but also result in the possibility of enhancing degradation and coloring of the polycarbonate resin.

Specifically, the reaction in the first stage may be conducted at a temperature of preferably 130-270° C., more preferably 150-240° C., even more preferably 180-230° C., in terms of the maximum internal temperature of the polymerization reactor, and a pressure of preferably 110–1 kPa, more preferably 70–5 kPa, even more preferably 30–10 kPa (absolute pressure), for preferably 0.1-10 hours, more preferably 0.5-3 hours, while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to preferably 200 Pa or below. The second and any succeeding stages are thus conducted at a maximum internal temperature of preferably 200-270° C., more preferably 220-260° C., for a period of generally 0.1-10 hours, preferably 1-6 hours, especially preferably 0.5-3 hours.

Especially from the standpoints of inhibiting the polycarbonate resin from taking a color or deteriorating thermally and of thereby obtaining the polycarbonate resin having a satisfactory hue, it is preferred that the maximum internal temperature in all reaction stages should be lower than 260° C., in particular 220-240° C. From the standpoints of inhibiting the rate of polymerization from decreasing in the latter half of the polymerization reaction and of thereby minimizing the deterioration caused by heat history, it is preferred to use, in the final stage of the polymerization, a horizontal reactor having excellent plug flow characteristics and interface renewal characteristics.

In case where the polymerization is conducted at too high a temperature or for too long a period in order to obtain a polycarbonate resin having a given molecular weight, there is a tendency that the resultant polycarbonate resin has an impaired hue and impaired thermal stability.

From the standpoint of effective utilization of resources, it is preferred that the monohydroxy compound which generated as a by-product should be reused as a starting material for diphenyl carbonate, bisphenol A, or the like after purified according to need.

The polycarbonate resin of the invention, after having been obtained through polycondensation as described above, is usually solidified by cooling and pelletized with a rotary cutter or the like.

Methods for the pelletization are not limited. Examples thereof include: a method in which the polycarbonate resin is discharged in a molten state from the final polymerization reactor, cooled and solidified in a strand form, and pelletized; a method in which the resin is fed in a molten state from the final polymerization reactor to a single- or twin-screw extruder, melt-extruded, subsequently cooled and solidified, and pelletized; and a method which includes discharging the resin in a molten state from the final polymerization reactor, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add generally known additives such as a heat stabilizer, neutralizing agent, ultraviolet absorber, release agent, colorant, antistatic agent, slip agent, lubricant, plasticizer, compatibilizing agent, and flame retardant and knead the mixture within the extruder.

The temperature to be used for melt kneading in the extruder depends on the glass transition temperature and molecular weight of the polycarbonate resin. However, the melt kneading temperature is usually preferably 150-300° C., more preferably 200-270° C., even more preferably 230-260° C. By regulating the melt kneading temperature to 150° C. or higher, the polycarbonate resin is made to have a reduced melt viscosity and impose a reduced load on the extruder, resulting in an improvement in productivity. By regulating the melt kneading temperature to 300° C. or lower, the polycarbonate is inhibited from deteriorating thermally, thereby preventing a decrease in mechanical strength due to a decrease in molecular weight and preventing coloring and gas evolution.

When a polycarbonate resin of the invention is produced using diphenyl carbonate or a substituted diphenyl carbonate, e.g., ditolyl carbonate, as the carbonic diester represented by the general formula (5), then phenol or a substituted phenol generates as a by-product and part of them unavoidably remains in the polycarbonate resin. There are cases where the phenol or substituted phenol is causative of an odor during molding or of coloring during exposure to high temperatures.

After a usual batch reaction, the polycarbonate resin contains aromatic monohydroxy compounds having an aromatic ring, e.g., by-product phenol, in an amount of 1,000 weight ppm or more. It is preferred to reduce the content thereof to preferably 700 weight ppm or less, more preferably 500 weight ppm or less, in particular 300 weight ppm or less, using a horizontal reactor having excellent volatile-removing performance or using an extruder with a vacuum bent. However, it is difficult to industrially completely remove the aromatic monohydroxy compounds. The lower limit of the content of aromatic monohydroxy compounds is generally 1 weight ppm.

Those aromatic monohydroxy compounds may, of course, have substituents, depending on the starting materials used. For example, the aromatic monohydroxy compounds may have an alkyl group having up to 5 carbon atoms, or the like.

When the polycarbonate resin of the invention is produced, it is desirable to dispose a filter in order to prevent inclusion of foreign matter. The position where a filter is disposed preferably is on the downstream side of the extruder. The rejection size (opening size) of the filter is preferably 100 μm or smaller in terms of 99% removal filtration accuracy. Especially when the resin is for use in film applications or the like for which inclusion of minute foreign particles should be avoided, the opening size of the filter is preferably 40 μm or smaller, more preferably 20 μm or smaller.

From the standpoint of preventing inclusion of foreign matter from occurring after extrusion, it is desirable that the polycarbonate resin of the invention should be extruded in a clean room having a cleanliness preferably higher than class 7 defined in JIS B9920 (2002), more preferably higher than class 6.

Furthermore, for cooling and pelletizing the extruded polycarbonate resin, it is preferred to use a cooling method such as air cooling or water cooling. It is preferred that air from which airborne foreign matter has been removed beforehand with a high-efficiency particulate air filter or the like should be used for the air cooling to prevent airborne foreign matter from adhering again.

In the case of conducting water cooling, it is preferred to use water from which metallic substances have been removed with an ion-exchange resin or the like and from which foreign matter has been removed with a filter. It is preferred that the filter to be used should have an opening size of 10-0.45 μm in terms of 99% removal filtration accuracy.

A heat stabilizer can be incorporated into the polycarbonate resin of the invention thus produced, in order to prevent the resin from suffering a decrease in molecular weight or hue deterioration during molding, etc.

Examples of the heat stabilizer include phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination.

The amount of those heat stabilizers to be incorporated per 100 parts by weight of the polycarbonate resin is preferably 0.0001-1 part by weight, more preferably 0.0005-0.5 parts by weight, even more preferably 0.001-0.2 parts by weight.

A generally known antioxidant can be incorporated into the polycarbonate resin of the invention for the purpose of preventing oxidation.

Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis [3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl)isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methylphenyl) propionyloxy]ethyl}-2,4,8,10-tetraoxaspiro(5,5)undecane, and the like.

The amount of those antioxidants to be incorporated per 100 parts by weight of the polycarbonate is preferably 0.0001-0.5 parts by weight.

The polycarbonate resin and the additives are mixed together by means of a tumbling mixer, supermixer, floating mixer, or the like and melt-kneaded, either simultaneously or in any desired order, with an extrusion, e.g., a single-screw, special single-screw, or twin-screw extruder, or with a twin-cylinder mixer, Nauta mixer, Banbury mixer, kneading rolls, or the like. Thus, an additive-containing polycarbonate resin can be produced.

The melt-kneading temperature of the extruder, which depends on the glass transition temperature and molecular weight of the polycarbonate resin, is generally 150-300° C., preferably 200-270° C. In case where the melt-kneading temperature is lower than 150° C., the polycarbonate resin has a high melt viscosity and imposes a larger burden to the extruder, resulting in a decrease in productivity. In case where the melt-kneading temperature is higher than 300° C., the polycarbonate considerably deteriorates thermally, resulting not only in a decrease in mechanical strength due to a decrease in molecular weight but also in coloring and gas evolution.

When the polycarbonate resin of the invention is produced by a melt polymerization method, the heat stabilizer and the antioxidant can be added to a monomer in order to improve the storage stability of the monomer or can be added during the polymerization for the purpose of preventing the polycarbonate from taking a color during the polymerization.

(Film Formation Method: Melt Extrusion)

From the standpoint of productivity, melt extrusion is a preferred method for forming the film according to the invention. In a preferred method for melt extrusion, the resin is extruded using a T-die and the extrudate is sent to a cooling roll. The temperature at which the polycarbonate is melted in this method, which is determined by the molecular weight, Tg, and melt flow characteristics of the polycarbonate, etc., is preferably in the range of 180-320° C., more preferably in the range of 200-300° C. In case where the temperature is too high, problems are apt to arise, such as coloring due to thermal deterioration, appearance failures due to foreign matter or silver streaking, and die lines extending from the T-die. In case where the temperature is too low, the polymer has too high a viscosity, and polymer orientation and strain due to stress are apt to remain.

The film thus formed has a retardation value of preferably 20 nm or less, more preferably 10 nm or less. In case where the retardation value of the film is larger than that value, this film, through stretching, gives a retardation film which has large unevenness in in-plane retardation value. Such too large retardation values are hence undesirable.

(Film Formation Method: Solution Casting)

Solution casting can also be used as a method for film formation. Suitable for use as the solvent are, for example, methylene chloride, 1,2-dichloroethane, 1,1,2,2-tetrachloroethane, dioxolane, dioxane, and the like. The amount of the residual solvent present in the film obtained by solution casting is preferably 2% by weight or less, more preferably 1% by weight or less. In case where the amount of the residual solvent is larger than 2% by weight, this film has a considerably lowered glass transition temperature and is undesirable from the standpoint of heat resistance.

(Film Thickness)

The thickness of the film of the invention is preferably in the range of 30-400 μm, more preferably in the range of 40-300 μm. In the case where this film is to be stretched to obtain a retardation film, the thickness of this film may be suitably determined within that range while taking account of the desired retardation value and thickness of the retardation film.

(Methods of Stretching)

By stretching and orienting the film thus obtained, a retardation film can be obtained. For the stretching, use can be made of a known method such as, for example, longitudinal uniaxial stretching, transverse-direction uniaxial stretching in which a tenter or the like is used, or simultaneous or successive biaxial stretching in which those uniaxial stretching techniques are used in combination. Although batch stretching may be conducted, continuous stretching is preferred from the standpoint of productivity. Furthermore, as compared with batch stretching, continuous stretching yields a retardation film having lower unevenness in in-plane retardation.

The stretching temperature is preferably in the range of (Tg−20° C.) to (Tg+30° C.), more preferably in the range of (Tg−10° C.) to (Tg+20° C.), in terms of temperature relative to the glass transition temperature of the polycarbonate. The stretch ratio, which is determined by a desired retardation value, is preferably 1.05-4, more preferably 1.1-3, for each of the longitudinal and transverse directions.

The film obtained by molding the polycarbonate resin according to the invention has a birefringence of preferably 0.001 or higher, more preferably 0.0014 or higher. In case where the birefringence of this film is too low, the retardation film obtained therefrom must have an increased thickness in order to exhibit the same retardation. There is hence the possibility that this retardation film cannot be applied to thin appliances.

Those values of birefringence were values measured in an examination of a film obtained through fixed-end uniaxial stretching conducted at a stretching temperature which was higher by 15° C. than the glass transition temperature of the polycarbonate resin of the invention.

In the film according to the invention, the ratio (Re450/Re550) of the retardation thereof measured at a wavelength of 450 nm (Re450) to the retardation thereof measured at a wavelength of 550 nm (Re550) is preferably 0.50-0.93, more preferably 0.70-0.90, even more preferably 0.85-0.90. When that ratio is too small, there are cases where this film gives a retardation film which, when laminated to a polarizing plate, causes a decrease in image quality.

The transparent film according to the invention has a photoelastic coefficient of preferably $40 \times 10^{-12}$ Pa$^{-1}$ or less, more preferably $35 \times 10^{-12}$ Pa$^{-1}$ or less, especially preferably $30 \times 10^{-12}$ Pa$^{-1}$ or less. In case where the photoelastic coefficient thereof is too high, there is the possibility that this film might give a retardation film which, when laminated to a polarizing plate, causes a decrease in image quality such as white fogging which occurs at the periphery of the screen.

The film of the invention can be used as a retardation film for various liquid-crystal display devices.

In the case where the film of the invention is to be used for color compensation in STN liquid-crystal display devices, a value of retardation thereof is generally selected from the range of 400-2,000 nm. In the case where the retardation film of the invention is to be used as a half-wave plate, a value of retardation thereof is selected from the range of 200-400 nm. In the case where the film of the invention is to be used as a quarter-wave plate, a value of retardation thereof is selected from the range of 90-200 nm. A more preferred value of retardation of the film for use as a quarter-wave plate is 100-180 nm.

When the film of the invention is used as the retardation film, one sheet of the film of the invention can be used alone or two or more sheets thereof can be used in combination. It is also possible to use the film of the invention in combination with another film, etc.

The film of the invention can be laminated through a pressure-sensitive adhesive to a known polarizing plate of the iodine type or dye type. When the film is laminated, it is necessary to laminate the film so that the polarization axis of the polarizing plate has a specific angle with the slow axis of the film in accordance with applications.

When the film of the invention is used as a quarter-wave plate and laminated to a polarizing plate, then this laminate can be used as a circular polarizing plate. In this case, the film is generally laminated to the polarizing plate so that the polarization axis of the polarizing plate has an angle of substantially 45° with the slow axis of the film.

Furthermore, the film of the invention may be used and laminated as a polarizer protective film which constitutes a polarizing plate. Moreover, the retardation film of the invention may be laminated, as a color compensator for STN liquid-crystal display devices, to a polarizing plate, and the resultant laminate can be used as an elliptical polarizer.

The polycarbonate resin of the invention has a moderately high birefringence and excellent heat resistance and moldability and further has a satisfactory hue and transparency. This polycarbonate resin can hence be used also as other optical films and in applications such as optical disks, optical prisms, and pickup lenses.

EXAMPLES

The invention will be explained below in more detail by reference to Examples. However, the invention should not be construed as being limited by the following Examples unless the invention departs from the spirit thereof.

The following abbreviations were used for compounds used in the following description of Examples.

BHEPF: 9,9-bis(4-(2-hydroxyethoxy)phenyl)fluorene (manufactured by Osaka Gas Chemicals Co., Ltd.)

ISB: isosorbide (trade name POLYSORB PS; manufactured by Roquette Freres)

CHDM: 1,4-cyclohexanedimethanol (manufactured by New Japan Chemical Co., Ltd.)

TCDDM: tricyclodecanedimethanol (manufactured by Oxea)

DEG: diethylene glycol (manufactured by Mitsubishi Chemical Corp.)

PEG #1000: polyethylene glycol; number-average molecular weight, 1,000 (manufactured by Sanyo Chemical Ltd.)

DPC: diphenyl carbonate (manufactured by Mitsubishi Chemical Corp.)

The following are methods used for determining properties of polycarbonate resins, methods used for evaluating the properties of the polycarbonate resins, and methods used for ascertaining conditions for producing the polycarbonate resins.

1) Glass Transition Temperature of Polycarbonate Resin

The glass transition temperature of a polycarbonate resin was measured using a differential scanning calorimeter (DSC 6220, manufactured by SII Nano Technology Inc.). About 10 mg of a polycarbonate resin sample was placed in an aluminum pan manufactured by the same company, and this pan was sealed. The contents were heated from room temperature to 250° C. at a heating rate of 20° C./min in a nitrogen stream having a flow rate of 50 mL/min. After that temperature was maintained for 3 minutes, the contents were cooled to 30° C. at a rate of 20° C./min. The contents were held at 30° C. for 3 minutes and then heated again to 200° C. at a rate of 20° C./min. An extrapolated glass transition initiation temperature determined from the DSC data obtained in the second heating was adopted.

2) Reduced Viscosity

A polycarbonate resin was dissolved in methylene chloride as a solvent to prepare a polycarbonate solution having a concentration of 0.6 g/dL. This solution was examined with an Ubbelohde viscometer manufactured by Moritomo Rika Kogyo) at a temperature of 20.0±0.1° C. The relative viscosity $\eta$rel was determined from the flow-down time of the solvent $t_0$ and the flow-down time of the solution t using the following equation.

$$\eta\text{rel}=t/t_0$$

The specific viscosity $\eta$sp was determined from the relative viscosity using the following equation.

$$\eta\text{sp}=(\eta-\eta_0)/\eta_0=\eta\text{rel}-1$$

The specific viscosity was divided by the concentration c (g/dL) to determine the reduced viscosity $\eta$sp/c.

3) Content of Components represented by the Formula (2)

About 0.5 g of a polycarbonate resin sample was precisely weighed out and placed in an Erlenmeyer flask. Thereto was added 5 mL of methylene chloride. The mixture was stirred to dissolve the resin. Thereafter, 45 mL of methanol and 5 mL of 25% aqueous sodium hydroxide solution were added thereto. The resultant solution was heated to 80° C. and reacted for 30 minutes with refluxing. After the reaction, 7 mL of 6-N hydrochloric acid and 10 mL of THF were added, and the resultant solution was wholly transferred to a 100-mL measuring flask, in which the volume of the contents was adjusted using pure water. The solution prepared was filtered through a 0.2-μm disk filter and examined by liquid chromatography. The amounts of a dihydroxy compound represented by the formula (1) and of components represented by the formula (2) were determined, and the content of the components represented by the formula (2) based on the dihydroxy compound represented by the formula (1) was calculated. In the Examples, a calibration curve was drawn using BHEPF, and quantitative determination was made by an absolute calibration method. Incidentally, since the amount of components represented by the formula (2) also was determined with the calibration curve drawn with BHEPF, this content value of the components is not the absolute content of compounds represented by the formula (2) but a value converted for BHEPF. The LC chart is shown in FIG. 1.

The apparatus and conditions used are as follows.

Apparatus: manufactured by Shimadzu Corp.
System controller: CBM-20A
Pump: LC-10AD
Column oven: CTO-10ASvp
Detector: SPD-M20A
Analysis column: Cadenza CD-18; 4.6 mm (diameter)×250 mm
Oven temperature: 60° C.
Detection wavelength: 300 nm
Eluent: Liquid A (0.1% aqueous phosphoric acid solution) and liquid B (acetonitrile) were used as mixtures thereof so that the A/B ratio was changed in a gradient manner from A/B=40/60 (vol %) to A/B=0/100 (vol %) over 10 minutes.
Flow rate: 1 mL/min
Sample injection amount:
1 μL (in the case of determining the amount of dihydroxy compound represented by the formula (1))
10 μL (in the case of determining the amount of components represented by the formula (2))

4) Determination of Proportion of Structural Units Derived from each Dihydroxy Compound in Polycarbonate Resin The proportion of structural units derived from each dihydroxy compound in a polycarbonate resin was determined in the following manner. A 30-mg portion of the polycarbonate resin was weighed out and dissolved in about 0.7 mL of heavy chloroform to obtain a solution. This solution was introduced into a tube for NMR spectroscopy having an inner diameter of 5 mm and examined for $^1$H NMR spectrum at ordinary temperature using JNM-AL400 (resonance frequency, 400

MHz), manufactured by JEOL Ltd. The proportion of structural units derived from each dihydroxy compound was determined from the ratio among the intensities of the structural-unit signals attributable to structural units derived from respective dihydroxy compounds.

The apparatus and conditions used are as follows.
Apparatus: JNM-AL400 (resonance frequency, 400 MHz), manufactured by JEOL Ltd.
Examination temperature: ordinary temperature
Relaxation time: 6 sec
Number of integrations: 128

5) Determination of Metal Content in Polycarbonate Resin

About 0.5 g of polycarbonate resin pellets were precisely weighed in a microwave decomposition vessel manufactured by PerkinElmer, Inc., and 2 mL of 97% sulfuric acid was added thereto. This vessel was sealed and heated with microwaves at 230° C. for 10 minutes. After the vessel was cooled to room temperature, 1.5 mL of 68% nitric acid was added to the contents. This vessel was sealed, heated with microwaves at 150° C. for 10 minutes, and then cooled again to room temperature. Thereto was added 2.5 mL of 68% nitric acid. This vessel was sealed again and heated with microwaves at 230° C. for 10 minutes to completely decompose the contents. After the vessel was cooled to room temperature, the liquid thus obtained was diluted with pure water. The content of metals therein was determined with an ICP-MS apparatus manufactured by Thermo Quest Co.

6) Determination of Phenol Content and DPC Content in Polycarbonate Resin

About 0.5 g of a sample was precisely weighed out and dissolved in 5 mL of methylene chloride. Thereafter, acetone was added thereto so as to result in a total amount of 25 mL. The resultant solution was filtered through a 0.2-μm disk filter, and the amounts of phenol and DPC were determined by liquid chromatography. Thereafter, the contents thereof were calculated.

The apparatus and conditions used are as follows.
Apparatus: manufactured by Shimadzu Corp.
System controller: CBM-20A
Pump: LC-10AD
Column oven: CTO-10ASvp
Detector: SPD-M20A
Analysis column: Cadenza CD-18; 4.6 mm (diameter)×250 mm
Oven temperature: 40° C.
Detection wavelength: 260 nm
Eluent: Liquid A (0.1% aqueous phosphoric acid solution) and liquid B (acetonitrile) were used as mixtures thereof so that the A/B ratio was changed in a gradient manner from A/B=40/60 (vol %) to A/B=0/100 (vol %) over 10 minutes.
Flow rate: 1 mL/min
Sample injection amount: 10 μL
Method for quantitative determination: absolute calibration method 7) Method for evaluating Initial Hue of Polycarbonate Resin The hue of a polycarbonate resin was evaluated in accordance with ASTM D1925 by measuring the yellowness index (YI) value of light reflected from pellets. Spectrocolorimeter CM-5, manufactured by Konica Minolta Inc., was used as an apparatus, and the selected measurement conditions included a measurement diameter of 30 mm and SCE. Calibration glass CM-A212 for laboratory dish measurements was fitted into the measuring part, and zero calibration box CM-A 124 was put thereon to conduct zero calibration. Subsequently, the built-in white calibration board was used to conduct white calibration.

A measurement was made using the white calibration board CM-A210, and it was ascertained that the reflected light had values of L* of 99.40±0.05, a* of 0.03±0.01, b* of −0.43±0.01, and YI of −0.58±0.01.

The pellets were examined in the state of having been placed in a cylindrical glass vessel with an inner diameter of 30 mm and a height of 50 mm to a depth of 30 mm or more. The pellets were taken out of the glass vessel and then examined again; this operation was repeated twice. The average of the measured values obtained in three measurements in total was used. The smaller the value of YI, the less the yellowness and the better the quality.

8) Method for evaluating Hue through Heat Aging Test

Resin pellets were placed in a 120° C. oven which had an air atmosphere inside. After 200 hours, the pellets were taken out and examined for YI value in the same manner as in (7) above. The difference between the YI value obtained after the heat aging test and the YI value obtained in (7) above is shown as ΔYI value. The smaller the ΔYI value, the better the thermal stability.

9) Determination of Amount of Sulfur Element in Polycarbonate Resin

A polycarbonate resin sample was placed in a boat made of platinum and heated in a quartz tube furnace (Type AQF-100, manufactured by Mitsubishi Chemical Corp.), and the sulfur contained in the combustion gas was absorbed in 0.03% aqueous hydrogen peroxide solution. The amount of $SO_4^{2-}$ contained in the absorbent liquid was determined with an ion chromatograph (Type ICS-1000, manufactured by Dionex Corp.).

10) Measurement of Melt Viscosity of Polycarbonate Resin

A polycarbonate resin sample which had been vacuum-dried at 80° C. for 5 hours was examined with a capillary rheometer (manufactured by Toyo Seiki Ltd.). The sample was heated to the same temperature as the reaction temperature, and the melt viscosity thereof was measured at shear rates in the range of 9.12-1,824 $sec^{-1}$. The value of melt viscosity obtained at 91.2 $sec^{-1}$ was used. An orifice having a die diameter of 1 mm and a length of 10 mm was used.

11) Measurement of Oxygen Concentration in Polymerization Reactor

The concentration was measured using an oxygen analyzer (1000RS, manufactured by AMI Inc.).

12) Determination of Proportion of Dihydroxy Compounds Distilled Off During Polymerization Reaction Three milliliters of a distillate resulting from a polymerization reaction was precisely weighed, and acetonitrile was added thereto to adjust the total volume to 10 mL. This solution was examined by gas chromatography to determine the content of dihydroxy compounds contained in the distillate. The amount of the dihydroxy compounds which had been distilled off was calculated from the total weight of all distillate, and the proportion of the dihydroxy compounds which had been distilled off was determined from the ratio between that amount of the dihydroxy compounds which had been distilled off and the feed amount of the dihydroxy compounds which had been subjected to the polymerization reaction.

The apparatus and measurement conditions used are as follows.
Apparatus: 6850, manufactured by Agilent Technology, Inc.
Column: DB-1 (inner diameter, 250 μm; length, 30 m; film thickness, 0.25 μm), manufactured by Agilent Technology, Inc.
Oven temperature: 50° C. holding for 3 minutes→heating at 10° C./min→250° C.→heating at 50° C./min→300° C. holding for 6 minutes Detector: flame ionization detector
Injection port temperature: 250° C.
Detector temperature: 320° C.
Carrier gas: helium
Sample injection amount: 1 µL,
Method for quantitative determination: absolute calibration method 11) Determination of Photoelastic Coefficient of Polycarbonate Resin The photoelastic coefficient was determined using an apparatus including a combination of a birefringence analyzer constituted of a He—Ne laser, polarizer, compensator, analyzer, and photodetector with an oscillatory type viscoelastometer (DVE-3, manufactured by Rheology Co., Ltd.). (For details, see *Nihon Reorogi Gakkai-shi*, Vol. 19, pp. 93-97 (1991).)

Four grams of a polycarbonate resin sample which had been vacuum-dried at 80° C. for 5 hours was pressed for 1 minute with a hot press at a hot-pressing temperature of 250° C. using a spacer having a width of 8 cm, length of 8 cm, and thickness of 0.5 mm under the conditions of a preheating period of 1 minute and a pressure of 20 MPa. Thereafter, the pressed resin was taken out together with the spacer and was pressed and cooled for 3 minutes at a pressure of 20 MPa by means of a water-tube-cooled press to produce a film. A sample having a width of 5 mm and a length of 20 mm was cut out of the film, fixed to the oscillatory type viscoelastometer, and examined for storage modulus E' at a frequency of 96 Hz at room temperature of 25° C.

Simultaneously therewith, the emitted laser light was passed through the polarizer, sample, compensator, and analyzer in this order, picked up with the photodetector (photodiode), and introduced into a lock-in amplifier. With respect to a waveform with an angular frequency ω or 2ω, a retardation for the amplitude and distortion was determined, and a strain-optical coefficient O' was determined. In this examination, the direction of the polarizer was perpendicular to the direction of the analyzer, and each of these directions was regulated so as to form an angle of π/4 with the sample elongation direction. The photoelastic coefficient (C) was determined from the storage modulus E' and the strain-optical coefficient O' using the following equation.

$$C = O'/E'$$

12) Retardation of Film Formed by Hot Pressing and Wavelength Dispersion Characteristics of Retardation Thereof A sample having a width of 6 cm and a length of 6 cm was cut out of the film obtained by the hot pressing described above. This sample was subjected to uniaxial stretching in a stretch ratio of 2.0 using a batch type biaxially stretching apparatus (manufactured by Toyo Seiki Ltd.) at a stretching temperature of (glass transition temperature of the polycarbonate resin)+15° C. and a stretching speed of 720 mm/min (strain rate, 1,200%/min). This stretching was conducted while holding the sample with respect to the direction perpendicular to the stretching direction (stretch ratio in the perpendicular direction, 1.0).

A test piece having a width of 4 cm and a length of 4 cm was cut out of the stretched sample and examined for retardation at wavelengths of 450, 500, 550, 590, and 630 nm using a retardation analyzer (KOBRA-WPR, manufactured by Oji Scientific Instruments) to determine the wavelength dispersion characteristics thereof. The wavelength dispersion characteristics were determined by calculating the ratio (Re450/Re550) between the retardation values Re450 and Re550 measured at 450 nm and 550 nm, respectively. When the retardation ratio is larger than 1, the wavelength dispersion is positive. When the retardation ratio is less than 1, the wavelength dispersion is negative. The smaller the ratio between those retardation values which is less than 1, the higher the negative wavelength dispersion characteristics.

13) Film Formation by Melt Extrusion

A polycarbonate resin which had been vacuum-dried at 80° C. for 5 hours was subjected to film formation with a film formation apparatus equipped with a single-screw extruder (manufactured by ISUZU KAKOKI Co., Ltd.; screw diameter, 25 mm; set cylinder temperature, 220° C.), a T-die (width, 200 mm; set temperature, 220° C.), a chill roll (set temperature, 120-130° C.), and a winder. Thus, a film having a thickness of 100 µm was produced.

14) Determination of Retardation of Film Formed by Melt Extrusion and Wavelength Dispersion Characteristics of Retardation Thereof A sample having a width of 6 cm and a length of 6 cm was cut out of the film obtained through melt extrusion by the method described above. This sample was subjected to uniaxial stretching in a stretch ratio of 2.0 using a batch type biaxially stretching apparatus (manufactured by Toyo Seiki Ltd.) at a set stretching temperature of (glass transition temperature of the polycarbonate resin)+15° C. and a stretching speed of 720 mm/min (strain rate, 1,200%/min) to obtain a transparent film. This stretching was conducted while holding the sample with respect to the direction perpendicular to the stretching direction (stretch ratio in the perpendicular direction, 1.0).

A test piece having a width of 4 cm and a length of 4 cm was cut out of the stretched sample and examined for retardation at wavelengths of 450, 500, 550, 590, and 630 nm using a retardation analyzer (KOBRA-WPR, manufactured by Oji Scientific Instruments) to determine the wavelength dispersion characteristics thereof. The wavelength dispersion characteristics were determined by calculating the ratio (Re450/Re550) between the retardation values Re450 and Re550 measured at 450 nm and 550 nm, respectively. When the retardation ratio is larger than 1, the wavelength dispersion is positive. When the retardation ratio is less than 1, the wavelength dispersion is negative. The smaller the ratio between those retardation values which is less than 1, the higher the negative wavelength dispersion characteristics.

15) Determination of Birefringence (Δn) of Film obtained by Melt Extrusion

A sample cut out of the film described above was examined for retardation at a wavelength of 590 nm (Re590) with the retardation analyzer. The retardation value was divided by the thickness (t) of the film to determine the birefringence according to the following equation.

$$\text{Birefringence } (\Delta n) = \text{Re}590/t$$

Example 1-1

Into a polymerization reactor (1) equipped with a stirrer and a reflux condenser regulated so as to have a temperature of 100° C. were introduced BHEPF, ISB, PEG #1000, DPC, and magnesium acetate tetrahydrate so that the BHEPF/ISB/PEG #1000/DPC/magnesium acetate tetrahydrate molar ratio was $0.445/0.552/0.003/1.015/1.20 \times 10^{-5}$. The BHEPF used had a total sulfur element content of 4.1 ppm. The DPC used had been purified by distillation to reduce the chloride ion concentration therein to 10 ppb or less.

The atmosphere in the polymerization reactor (1) was sufficiently replaced with nitrogen. Thereafter (oxygen concentration, 0.0005-0.001 vol %), the contents were heated with a heat medium, and stirring was initiated when the internal temperature reached 100° C. The internal temperature was elevated so as to reach 220° C. at 40 minutes after initiation of the heating, and the polymerization reactor was regulated so that the temperature was maintained. Simultaneously therewith, pressure reduction was initiated, and the pressure was reduced to 13.3 kPa (absolute pressure; the same applies hereinafter) over 90 minutes after 220° C. had been reached. The system was held for further 30 minutes while maintaining that pressure. The phenol vapor which had generated as a by-product with the progress of the polymerization reaction was introduced into the 100° C. reflux condenser. The monomer ingredients contained in a slight amount in the phenol vapor were returned to the polymerization reactor (1), and the phenol vapor which had not been condensed was introduced into a 45° C. condenser and recovered.

The internal pressure of the polymerization reactor (1) was temporarily returned to atmospheric pressure. Thereafter, the contents of the polymerization reactor (1), which had become an oligomer, were transferred to another polymerization reactor (2) equipped with a stirrer and a reflux condenser regulated so as to have a temperature of 100° C. Subsequently, heating of the inside of the polymerization reactor (2) and reduction of the internal pressure thereof were initiated, and the internal temperature and the pressure were changed to 240° C. and 200 Pa, respectively, over 50 minutes. Thereafter, the pressure was reduced to 200 Pa or less over 20 minutes and, at the time when a given stirring power had been reached, the pressure was returned to atmospheric pressure. The contents were discharged in the form of a strand and pelletized with a rotary cutter. The polycarbonate resin obtained had a reduced viscosity of 0.352 dL/g, a glass transition temperature of 145° C., and a YI of 26, showing that a resin having a satisfactory color tone was obtained. The composition regarding copolymerization of this polycarbonate resin was substantially the same as the composition of the feed monomers.

Subsequently, film formation therefrom was conducted by the method described above. As a result, a film having few appearance failures was obtained. The polycarbonate resin which had been formed into the film had a reduced viscosity of 0.345, showing that the polycarbonate resin had undergone no considerable decrease in molecular weight. This polycarbonate resin further had an Re450/Re550 value of 0.878, a Δn of 0.0021, and a photoelastic coefficient of 28; desired values were obtained with respect to all optical properties. The properties of the polycarbonate resin obtained and the results of evaluation thereof are shown in Table 1.

Example 1-2

The same procedure as in Example 1-1 was conducted, except that BHEPF, ISB, PEG #1000, DPC, and magnesium acetate tetrahydrate were introduced into the polymerization reactor so that the BHEPF/ISB/PEG #1000/DPC/magnesium acetate tetrahydrate molar ratio was 0.432/0.556/0.012/1.005/1.20×10$^{-5}$. The properties of the polycarbonate resin obtained and the results of evaluation thereof are shown in Table 1.

The resin obtained had a reduced viscosity of 0.389 dL/g, a glass transition temperature of 131° C., and a satisfactory color tone. This polycarbonate resin had higher flexibility and better melt processability than the polycarbonate resin of Example 1-1. Thus, the glass transition temperature and the melt viscosity can be regulated to such a degree that no influence is exerted to the optical properties, by using a polydiol such as polyethylene glycol in a small amount.

Example 1-3

The same procedure as in Example 1-1 was conducted, except that BHEPF, ISB, TCDDM, DPC, and calcium acetate monohydrate were introduced into the polymerization reactor so that the BHEPF/ISB/TCDDM/DPC/calcium acetate monohydrate molar ratio was 0.300/0.400/0.300/1.005/6.00× 10$^{-6}$. The properties of the polycarbonate resin obtained and the results of evaluation thereof are shown in Table 1.

A polycarbonate resin having a satisfactory color tone was obtained. Although excellent also in terms of melt processability, this polycarbonate resin had a slightly small value of birefringence.

Example 1-4

The same procedure as in Example 1-1 was conducted, except that BHEPF, ISB, DEG, DPC, and calcium acetate monohydrate were introduced into the polymerization reactor so that the BHEPF/ISB/DEG/DPC/calcium acetate monohydrate molar ratio was 0.380/0.435/0.185/1.015/6.00×10$^{-6}$. The properties of the polycarbonate resin obtained and the results of evaluation thereof are shown in Table 1. A polycarbonate resin which was excellent in terms of color tone, melt processability, and optical properties was obtained.

Example 1-5

Cesium carbonate was used as a polymerization catalyst. The same procedure as in Example 1-1 was conducted, except that BHEPF, ISB, PEG #1000, DPC, and cesium carbonate were introduced into the polymerization reactor so that the BHEPF/ISB/PEG #1000/DPC/cesium carbonate molar ratio was 0.445/0.552/0.003/1.005/1.20×10$^{-5}$. The properties of the polycarbonate resin obtained and the results of evaluation thereof are shown in Table 1. The polycarbonate resin obtained had a YI of 37, showing that this resin was inferior in color tone to the polycarbonate resin of Example 1-1.

Comparative Example 1-1

The same procedure as in Example 1-1 was conducted, except that BHEPF, ISB, DPC, and magnesium acetate tetrahydrate were introduced into the polymerization reactor so that the BHEPF/ISB/DPC/magnesium acetate tetrahydrate molar ratio was 0.400/0.600/1.015/1.20×10$^{-5}$. The properties of the polycarbonate resin obtained and the results of evaluation thereof are shown in Table 1. This polycarbonate resin had a reduced viscosity of 0.358 dL/g and a glass transition temperature of 151° C. This resin was subjected to film formation. As a result, the film had silver streaks. No film having a satisfactory appearance was obtained.

Comparative Example 1-2

The same procedure as in Example 1-1 was conducted, except that BHEPF, ISB, CHDM, DPC, and calcium acetate monohydrate were introduced into the polymerization reactor so that the BHEPF/ISB/CHDM/DPC/calcium acetate monohydrate molar ratio was 0.330/0.335/0.335/1.005/6.00×10$^{-6}$. The properties of the polycarbonate resin obtained and the results of evaluation thereof are shown in Table 1. This polycarbonate resin had an Re450/Re550 value of 0.953, showing that the wavelength dispersion characteristics thereof were insufficient. The resin further had a photoelastic coefficient of 30×10⁻¹² Pa⁻¹, which was slightly high.

The amount of dihydroxy compounds which had been distilled off and were contained in the distillate that had resulted from the polymerization reaction was determined and was found to be 3.5 wt %. The amount of the dihydroxy compounds which had been distilled off was larger than in Example 1-1. The analytical values of the composition regarding copolymerization of this polycarbonate resin did not agree with the starting-material feed amounts, showing that it was difficult to control the composition of this polycarbonate resin.

CONCLUSION

It can be seen from the results shown in Table 1 that a polycarbonate resin which had an excellent balance among color tone, melt processability, and optical properties is obtained by using a suitable combination of dihydroxy compounds.

The DPC used had been purified by distillation to reduce the chloride ion concentration therein to 10 ppb or less. The atmosphere in the polymerization reactor (1) was sufficiently replaced with nitrogen. Thereafter (oxygen concentration, 0.0005-0.001 vol %), the contents were heated with a heat medium, and stirring was initiated when the internal temperature reached 100° C. The internal temperature was elevated so as to reach 220° C. at 40 minutes after initiation of the heating, and the polymerization reactor was regulated so that the temperature was maintained. Simultaneously therewith, pressure reduction was initiated, and the pressure was reduced to 13.3 kPa (absolute pressure; the same applies hereinafter) over 90 minutes after 220° C. had been reached. The system was held for further 30 minutes while maintaining that pressure. The phenol vapor which had generated as a by-product with the progress of the polymerization reaction was introduced into the 100° C. reflux condenser. The monomer ingredients contained in a slight amount in the phenol vapor were returned to

TABLE 1

Properties of polycarbonate resins and results of evaluation

| | | | Example 1-1 | Example 1-2 | Example 1-3 | Example 1-4 | Example 1-5 | Comparative Example 1-1 | Comparative Example 1-2 |
|---|---|---|---|---|---|---|---|---|---|
| Resin composition | BHEPF | mol % | 44.5 | 43.2 | 30.1 | 38.1 | 44.5 | 40.0 | 33.0 |
| | ISB | mol % | 55.2 | 55.6 | 40.0 | 43.6 | 55.2 | 60.0 | 33.8 |
| | PEG #1000 | mol % | 0.3 | 1.2 | — | — | 0.3 | — | — |
| | CHDM | mol % | — | — | — | — | — | — | 33.2 |
| | TCDDM | mol % | — | — | 29.9 | — | — | — | — |
| | DEG | mol % | — | — | — | 18.3 | — | — | — |
| | Content of fluorene-based dihydroxy compound | wt % | 63.7 | 61.1 | 47.6 | 60.0 | 63.6 | 60.3 | 53.7 |
| | Content of Group-2 metals and lithium per mole of all dihydroxy compounds | μmol | 12.5 | 12.3 | 6.3 | 6.5 | <0.5 | 12.4 | 6.4 |
| | Content of sodium, potassium, and cesium per mole of all dihydroxy compounds | μmol | <0.5 | <0.5 | <0.5 | <0.5 | 12.4 | <0.5 | <0.5 |
| | Proportion of all dihydroxy compounds distilled off during polymerization reaction | wt % | 0.3 | 0.2 | 1.3 | 2.8 | 0.3 | 0.2 | 3.5 |
| Resin properties | Glass transition temperature | ° C. | 145 | 131 | 130 | 128 | 145 | 151 | 126 |
| | Reduced viscosity (A) | dL/g | 0.352 | 0.389 | 0.381 | 0.380 | 0.349 | 0.358 | 0.445 |
| | Melt viscosity | Pa·s | 2900 | 3000 | 2200 | 2300 | 2700 | 3300 | 2200 |
| | YI | — | 26 | 25 | 20 | 23 | 37 | 30 | 12 |
| Optical properties | Re450/Re550 | — | 0.878 | 0.887 | 0.915 | 0.887 | 0.876 | 0.910 | 0.953 |
| | Δn | — | 0.0021 | 0.0025 | 0.0016 | 0.0030 | 0.0021 | 0.0023 | 0.0047 |
| | Photoelastic coefficient | ×10⁻¹² Pa⁻¹ | 28 | 28 | 25 | 28 | 29 | 26 | 30 |
| Melt processability | Reduced viscosity after film formation (B) | dL/g | 0.345 | 0.378 | 0.375 | 0.367 | 0.346 | 0.346 | 0.433 |
| | B/A | — | 0.980 | 0.972 | 0.984 | 0.966 | 0.991 | 0.966 | 0.973 |
| | Film appearance | — | good | good | good | good | good | silver streaking | good |
| Comprehensive evaluation | | — | good | good | good | good | good | poor | good |

Example 2-1

Into a polymerization reactor (1) equipped with a stirrer and a reflux condenser regulated so as to have a temperature of 100° C. were introduced BHEPF, ISB, DEG, DPC, and lithium acetate so that the BHEPF/ISB/DEG/DPC/lithium acetate molar ratio was 0.380/0.435/0.185/1.00/6.00×10⁻⁶. The BHEPF used had a total sulfur element content of 4.1 ppm.

the polymerization reactor (1), and the phenol vapor which had not been condensed was introduced into a 45° C. condenser and recovered.

The internal pressure of the polymerization reactor (1) was temporarily returned to atmospheric pressure. Thereafter, the contents of the polymerization reactor (1), which had become an oligomer, were transferred to another polymerization reactor (2) equipped with a stirrer and a reflux condenser regulated so as to have a temperature of 100° C. Subsequently, heating of the inside of the polymerization reactor (2) and reduction of the internal pressure thereof were initiated, and the internal temperature and the pressure were changed to 240° C. and 200 Pa, respectively, over 50 minutes. Thereafter, the pressure was reduced to 200 Pa or less over 20 minutes and, at the time when a given stirring power had been reached, the pressure was returned to atmospheric pressure. The contents were discharged in the form of a strand and pelletized with a rotary cutter. A resin which had a reduced viscosity of 0.368 dL/g and a glass transition temperature of 148° C. was obtained.

The polycarbonate resin obtained by the method described above was analyzed. As a result, the total content of compounds represented by the formula (2) was 162 ppm of the fluorene-based compound, and the a/b value was 9.9. The resin had an initial YI of 25.8 and a ΔYI, as determined through the heat aging test, of 4.5, showing that the resin had an excellent color tone and excellent heat resistance. The properties of the polycarbonate resin obtained and the results of evaluation thereof are shown in Table 2.

Example 2-2

The same procedure as in Example 2-1 was conducted, except that BHEPF, ISB, DEG, DPC, and magnesium acetate tetrahydrate were introduced into the polymerization reactor so that the BHEPF/ISB/DEG/DPC/magnesium acetate tetrahydrate molar ratio was $0.380/0.435/0.185/1.00/6.00 \times 10^{-6}$. Thus, a polycarbonate resin was obtained. The properties of the polycarbonate resin obtained and the results of evaluation thereof are shown in Table 2. The total content of compounds represented by the formula (2) was 155 ppm of the fluorene-based compound, and the a/b value was 9.6. A polycarbonate resin of excellent quality was obtained as in Example 2-1.

Example 2-3

The same procedure as in Example 2-1 was conducted, except that BHEPF, ISB, DEG, DPC, and calcium acetate monohydrate were introduced into the polymerization reactor so that the BHEPF/ISB/DEG/DPC/calcium acetate monohydrate molar ratio was $0.380/0.435/0.185/1.00/6.00 \times 10^{-6}$. Thus, a polycarbonate resin was obtained. The properties of the polycarbonate resin obtained and the results of evaluation thereof are shown in Table 2. The total content of compounds represented by the formula (2) was 146 ppm of the fluorene-based compound, and the a/b value was 9.0. A polycarbonate resin of excellent quality was obtained as in Example 2-1.

Example 2-4

The same procedure as in Example 2-1 was conducted, except that BHEPF, ISB, DEG, DPC, and barium acetate were introduced into the polymerization reactor so that the BHEPF/ISB/DEG/DPC/barium acetate molar ratio was $0.380/0.435/0.185/1.00/6.00 \times 10^{-6}$. Thus, a polycarbonate resin was obtained. The properties of the polycarbonate resin obtained and the results of evaluation thereof are shown in Table 2. The total content of compounds represented by the formula (2) was 172 ppm of the fluorene-based compound, and the a/b value was 10.7. A polycarbonate resin of excellent quality was obtained as in Example 2-1.

Example 2-5

The same procedure as in Example 2-1 was conducted, except that BHEPF, ISB, PEG #1000, DPC, and calcium acetate monohydrate were introduced into the polymerization reactor so that the BHEPF/ISB/PEG #1000/DPC/calcium acetate monohydrate molar ratio was $0.445/0.552/0.003/1.00/1.20 \times 10^{-5}$. Thus, a polycarbonate resin was obtained. The properties of the polycarbonate resin obtained and the results of evaluation thereof are shown in Table 2. The total content of compounds represented by the formula (2) was 322 ppm of the fluorene-based compound, and the a/b value was 11.7. A polycarbonate resin of excellent quality was obtained.

Comparative Example 2-1

The same procedure as in Example 2-1 was conducted, except that BHEPF, ISB, DPC, and sodium hydrogen carbonate were introduced into the polymerization reactor so that the BHEPF/ISB/DPC/sodium hydrogen carbonate molar ratio was $0.400/0.600/1.00/8.00 \times 10^{-6}$. Thus, a polycarbonate resin was obtained. The properties of the polycarbonate resin obtained and the results of evaluation thereof are shown in Table 2. The total content of compounds represented by the formula (2) was 612 ppm of the fluorene-based compound, and the a/b value was 24.1. This resin was poor in color tone and heat resistance.

Comparative Example 2-2

The same procedure as in Example 2-1 was conducted, except that BHEPF, ISB, CHDM, DPC, and sodium hydrogen carbonate were introduced into the polymerization reactor so that the BHEPF/ISB/CHDM/DPC/sodium hydrogen carbonate molar ratio was $0.330/0.335/0.335/1.00/6.00 \times 10^{-6}$. Thus, a polycarbonate resin was obtained. The properties of the polycarbonate resin obtained and the results of evaluation thereof are shown in Table 2. The total content of compounds represented by the formula (2) was 490 ppm of the fluorene-based compound, and the a/b value was 26.5. This resin was poor in color tone and heat resistance.

It can be seen from the results given in Table 2 that in the case of polycarbonate resins produced from dihydroxy compounds including a dihydroxy compound represented by the formula (1), the total content of compounds represented by the formula (2) is reduced by controlling the reaction conditions, catalyst to be used, metal content, etc., and polycarbonate resins having a satisfactory color tone and satisfactory heat resistance are obtained.

Furthermore, the films obtained from the polycarbonate resins of the invention have satisfactory wavelength dispersion characteristics and a satisfactory photoelastic coefficient, and are suitable for use as quarter-wave plates.

The copolycarbonate of the invention has a satisfactory hue and satisfactory transparency and is reduced in optical strain. This copolycarbonate is hence suitable for use in lens applications such as camera lenses, finder lenses, and lenses for CCDs or CMOSs and in optical applications including diffusion sheets and polarizing films. Furthermore, since the retardation thereof shows reverse wavelength dispersion characteristics, this copolycarbonate is suitable for use as retardation films especially for liquid-crystal or plasma displays or the like.

TABLE 2

Properties of polycarbonate resins and results of evaluation

|  |  |  |  | Example 2-1 | Example 2-2 | Example 2-3 | Example 2-4 | Example 2-5 | Comparative Example 2-1 | Comparative Example 2-2 |
|---|---|---|---|---|---|---|---|---|---|---|
| Kind of catalyst metal |  |  |  | Li | Mg | Ca | Ba | Mg | Na | Na |
| Monomer feeding | Proportion of structural units derived from dihydroxy compound | BHEPF | mol % | 38.0 | 38.0 | 38.0 | 38.0 | 44.5 | 40.0 | 33.0 |
|  |  | ISB |  | 43.5 | 43.5 | 43.5 | 43.5 | 55.2 | 60.0 | 33.8 |
|  |  | DEG |  | 18.5 | 18.5 | 18.5 | 18.5 | — | — | — |
|  |  | CHDM |  | — | — | — | — | — | — | 33.2 |
|  |  | PEG #1000 |  | — | — | — | — | 0.3 | — | — |
|  | Surfur content of BHEPF |  | ppm | 4.1 | 4.1 | 4.1 | 4.1 | 4.1 | 4.1 | 4.1 |
|  | Amount of catalyst metal per mole of all dihydroxy compounds |  | μmol | 6.0 | 6.0 | 6.0 | 6.0 | 12.0 | 10.0 | 6.0 |
| Polycarbonate resin | Total content (a) of compnods represented by the formula (2) based on dihydroxy compound represented by the formula (1) |  | ppm | 162 | 155 | 146 | 172 | 322 | 612 | 490 |
|  | Total amount (b) of Group-1 metals and Group-2 metals per mole of dihydroxy compound represented by the formula (1) |  | μmol | 16.3 | 16.2 | 16.3 | 16.1 | 27.0 | 25.4 | 18.5 |
|  | a/b |  | — | 9.9 | 9.6 | 9.0 | 10.7 | 11.9 | 24.1 | 26.5 |
|  | Content of Group-2 metals and lithium per mole of dihydroxy compound represented by the formula (1) |  | μmol | 16.0 | 16.1 | 16.1 | 16.2 | 27.0 | 25.2 | <0.5 |
|  | Content of Na, K, and Cs per mole of dihydroxy compound represented by the formula (1) |  | μmol | <0.5 | <0.5 | <0.5 | <0.5 | <0.1 | <0.5 | 18.4 |
| Resin properties | Reduced viscosity |  | dL/g | 0.379 | 0.380 | 0.383 | 0.380 | 0.354 | 0.358 | 0.424 |
|  | Glass transition temperature |  | °C. | 128 | 127 | 127 | 128 | 145 | 151 | 127 |
|  | Pellet YI |  | — | — | 25.8 | 23.5 | 23.4 | 26.0 | 26.5 | 36.7 | 32.1 |
|  | Heat aging test ΔYI |  | — | 4.5 | 4.2 | 4.4 | 4.7 | 4.4 | 6.5 | 6.5 |
|  | Re450/Re550 |  | — | — | 0.887 | 0.886 | 0.887 | 0.886 | 0.878 | 0.907 | 0.950 |
|  | Photoelastic coefficient |  | ×10⁻¹² Pa⁻¹ | 29 | 29 | 28 | 29 | 28 | 28 | 31 |

Example 3-1

Into a polymerization reactor (1) equipped with a stirrer and a reflux condenser regulated so as to have a temperature of 100° C. were introduced BHEPF, ISB, DEG, DPC, and lithium acetate so that the BHEPF/ISB/DEG/DPC/lithium acetate molar ratio was 0.380/0.435/0.185/1.00/6.00×10⁻⁶. The BHEPF used had a total sulfur element content of 4.1 ppm. The DPC used had been purified by distillation to reduce the chloride ion concentration therein to 10 ppb or less.

The atmosphere in the polymerization reactor (1) was sufficiently replaced with nitrogen. Thereafter (oxygen concentration, 0.0005-0.001 vol %), the contents were heated with a heat medium, and stirring was initiated when the internal temperature reached 100° C. The internal temperature was elevated so as to reach 220° C. at 40 minutes after initiation of the heating, and the polymerization reactor was regulated so that the temperature was maintained. Simultaneously therewith, pressure reduction was initiated, and the pressure was reduced to 13.3 kPa (absolute pressure; the same applies hereinafter) over 90 minutes after 220° C. had been reached. The system was held for further 30 minutes while maintaining that pressure. The phenol vapor which had generated as a by-product with the progress of the polymerization reaction was introduced into the 100° C. reflux condenser. The monomer ingredients contained in a slight amount in the phenol vapor were returned to the polymerization reactor (1), and the phenol vapor which had not been condensed was introduced into a 45° C. condenser and recovered.

The internal pressure of the polymerization reactor (1) was temporarily returned to atmospheric pressure. Thereafter, the contents of the polymerization reactor (1), which had become an oligomer, were transferred to another polymerization reactor (2) equipped with a stirrer and a reflux condenser regulated so as to have a temperature of 100° C. Subsequently, heating of the inside of the polymerization reactor (2) and reduction of the internal pressure thereof were initiated, and the internal temperature and the pressure were changed to 240° C. and 200 Pa, respectively, over 50 minutes. Thereafter, the pressure was reduced to 133 Pa or less over 20 minutes and, at the time when a given stirring power had been reached, the pressure was returned to atmospheric pressure. The contents were discharged in the form of a strand and pelletized with a rotary cutter.

The polycarbonate resin obtained had a reduced viscosity of 0.368 dL/g and a glass transition temperature of 148° C. Furthermore, the proportion of structural units derived from each dihydroxy compound was determined. As a result, it was found that the resin obtained had a composition which substantially agreed with the composition of the feed monomers.

The polycarbonate resin obtained was examined for metal content, phenol content, DPC content, and pellet YI value by the methods described above. Furthermore, the value of ΔYI was calculated through a YI value measurement conducted after the heat aging test. The properties of the polycarbonate resin obtained and the results of evaluation thereof are shown in Table 3.

Example 3-2

The same procedure as in Example 3-1 was conducted, except that BHEPF, ISB, DEG, DPC, and magnesium acetate tetrahydrate were introduced into the polymerization reactor so that the BHEPF/ISB/DEG/DPC/magnesium acetate tetrahydrate molar ratio was 0.380/0.435/0.185/1.00/6.00×10$^{-6}$. Thus, a polycarbonate resin was obtained. The properties of the polycarbonate resin obtained and the results of evaluation thereof are shown in Table 3.

Example 3-3

The same procedure as in Example 3-1 was conducted, except that BHEPF, ISB, DEG, DPC, and calcium acetate monohydrate were introduced into the polymerization reactor so that the BHEPF/ISB/DEG/DPC/calcium acetate monohydrate molar ratio was 0.380/0.435/0.185/1.00/6.00×10$^{-6}$. Thus, a polycarbonate resin was obtained. The properties of the polycarbonate resin obtained and the results of evaluation thereof are shown in Table 3. Furthermore, the polycarbonate resin obtained was hot-pressed into a film by the hot pressing method described under 11) above, and this film was examined for various optical properties. The results thereof are shown in Table 5.

Example 3-4

The same procedure as in Example 3-1 was conducted, except that BHEPF, ISB, DEG, DPC, and barium acetate were introduced into the polymerization reactor so that the BHEPF/ISB/DEG/DPC/barium acetate molar ratio was 0.380/0.435/0.185/1.00/6.00×10$^{-6}$. Thus, a polycarbonate resin was obtained. The properties of the polycarbonate resin obtained and the results of evaluation thereof are shown in Table 3.

Example 3-5

The same procedure as in Example 3-1 was conducted, except that BHEPF, ISB, DEG, DPC, and calcium acetate monohydrate were introduced into the polymerization reactor so that the BHEPF/ISB/DEG/DPC/calcium acetate monohydrate molar ratio was 0.380/0.435/0.185/1.00/8.00×10$^{-6}$. Thus, a polycarbonate resin was obtained. The rate of polymerization was exceedingly high and, hence, the given stirring power in the reaction within the polymerization reactor (2) was reached before the pressure decreased to 133 Pa or less. The properties of the polycarbonate resin obtained and the results of evaluation thereof are shown in Table 3.

Example 3-6

The same procedure as in Example 3-1 was conducted, except that BHEPF, ISB, DPC, and calcium acetate monohydrate were introduced into the polymerization reactor so that the BHEPF/ISB/DPC/calcium acetate monohydrate molar ratio was 0.400/0.600/1.00/8.00×10$^{-6}$. Thus, a polycarbonate resin was obtained. The properties of the polycarbonate resin obtained and the results of evaluation thereof are shown in Table 4. Furthermore, the polycarbonate resin obtained was hot-pressed into a film by the hot pressing method described under 11) above, and this film was examined for various optical properties. The results thereof are shown in Table 5.

Example 3-7

The same procedure as in Example 3-1 was conducted, except that BHEPF, ISB, CHDM, DPC, and calcium acetate monohydrate were introduced into the polymerization reactor so that the BHEPF/ISB/CHDM/DPC/calcium acetate monohydrate molar ratio was 0.330/0.335/0.335/1.00/6.00×10$^{-6}$. Thus, a polycarbonate resin was obtained. The properties of the polycarbonate resin obtained and the results of evaluation thereof are shown in Table 4. Furthermore, the polycarbonate resin obtained was hot-pressed into a film by the hot pressing method described under 11) above, and this film was examined for various optical properties. The results thereof are shown in Table 5.

Example 3-8

The same procedure as in Example 3-1 was conducted, except that BHEPF, ISB, PEG #1000, DPC, and magnesium acetate tetrahydrate were introduced into the polymerization reactor so that the BHEPF/ISB/PEG #1000/DPC/magnesium acetate tetrahydrate molar ratio was 0.445/0.552/0.003/1.015/1.20×10$^{-5}$. Thus, a polycarbonate resin was obtained. The properties of the polycarbonate resin obtained and the results of evaluation thereof are shown in Table 4. The polycarbonate resin obtained was hot-pressed into a film by the hot pressing method described under 11) above, and this film was examined for various optical properties. The results thereof are shown in Table 5.

Example 3-9

The same procedure as in Example 3-1 was conducted, except that BHEPF, ISB, DEG, DPC, and sodium hydrogen carbonate were introduced into the polymerization reactor so that the BHEPF/ISB/DEG/DPC/sodium hydrogen carbonate molar ratio was 0.380/0.435/0.185/1.00/6.00×10$^{-6}$. Thus, a polycarbonate resin was obtained. The properties of the polycarbonate resin obtained and the results of evaluation thereof are shown in Table 3.

Example 3-10

The same procedure as in Example 3-1 was conducted, except that BHEPF, ISB, DEG, DPC, and cesium carbonate were introduced into the polymerization reactor so that the BHEPF/ISB/DEG/DPC/cesium carbonate molar ratio was 0.380/0.435/0.185/1.00/3.00×10$^{-6}$. Thus, a polycarbonate resin was obtained. The properties of the polycarbonate resin obtained and the results of evaluation thereof are shown in Table 3.

Example 3-11

The same procedure as in Example 3-1 was conducted, except that BHEPF, ISB, DPC, and calcium acetate monohydrate were introduced into the polymerization reactor so that the BHEPF/ISB/DPC/calcium acetate monohydrate molar ratio was 0.400/0.600/1.00/8.00×10$^{-6}$. Thus, a polycarbonate resin was obtained. The properties of the polycarbonate resin obtained and the results of evaluation thereof are shown in Table 4.

Example 3-12

BHEPF having a total sulfur element content of 10.1 ppm was used. The same procedure as in Example 3-6 was conducted, except that BHEPF, ISB, DPC, and calcium acetate monohydrate were introduced into the polymerization reactor so that the BHEPF/ISB/DPC/calcium acetate monohydrate molar ratio was 0.400/0.600/1.00/2.00×10$^{-5}$, because the reaction did not proceed sufficiently when the catalyst amount was the same as in Example 3-6. Thus, a polycarbonate resin was obtained. The properties of the polycarbonate resin obtained and the results of evaluation thereof are shown in Table 4.

Comparative Example 3-5

The same procedure as in Example 3-1 was conducted, except that BHEPF, DPC, and sodium hydrogen carbonate were introduced into the polymerization reactor so that the BHEPF/DPC/sodium hydrogen carbonate molar ratio was 1.00/1.00/3.00×10$^{-5}$ and that the final polymerization temperature was changed to 260° C. Thus, a polycarbonate resin was obtained. The properties of the polycarbonate resin obtained and the results of evaluation thereof are shown in Table 4. The polycarbonate resin obtained was hot-pressed into a film by the hot pressing method described under 11) above, and this film was examined for various optical properties. The results thereof are shown in Table 5.

Comparative Example 3-6

The same procedure as in Example 3-1 was conducted, except that ISB, DPC, and sodium hydrogen carbonate were introduced into the polymerization reactor so that the ISB/DPC/sodium hydrogen carbonate molar ratio was 1.00/1.00/1.50×10$^{-6}$. Thus, a polycarbonate resin was obtained. The results are shown in Table 4. The polycarbonate resin obtained was hot-pressed into a film by the hot pressing method described under 11) above, and this film was examined for various optical properties. The results thereof are shown in Table 5.

It can be seen from the results given in Table 3 to Table 5 that in the case of copolycarbonate resins produced from dihydroxy compounds including a dihydroxy compound represented by the formula (1), polycarbonate resins which do not have an excessively large value of Re450/Re550 and which are suitable for use as optical films and have a satisfactory color tone and satisfactory heat resistance are obtained by regulating the kind and amount of the catalyst to be used and regulating the content of specific metals to or below a specific amount. Furthermore, the results given in Table 5 show that the polycarbonate resins of the invention exhibit satisfactory reverse wavelength dispersion characteristics, etc. and can be used as quarter-wave plates.

The copolycarbonate of the invention has a satisfactory hue and satisfactory transparency and is reduced in optical strain. This copolycarbonate is hence suitable for use in lens applications such as camera lenses, finder lenses, and lenses for CCDs or CMOSs and in optical applications including diffusion sheets and polarizing films. Furthermore, since the retardation thereof shows reverse wavelength dispersion characteristics, this copolycarbonate is suitable for use as retardation films especially for liquid-crystal or plasma displays or the like.

TABLE 3

Properties of polycarbonate resins and results of evaluation

| | | | | Example 3-1 | Example 3-2 | Example 3-3 | Example 3-4 | Example 3-9 | Example 3-10 | Example 3-5 |
|---|---|---|---|---|---|---|---|---|---|---|
| Kind of catalyst metal | | | | Li | Mg | Ca | Ba | Na | Cs | Ca |
| Polycarbonate resin | Proportion of structural units derived from dihydroxy compound | BHEPF | mol % | 38.0 | 38.2 | 38.0 | 38.1 | 38.0 | 38.0 | 38.0 |
| | | ISB | | 43.5 | 43.5 | 43.5 | 43.9 | 43.7 | 43.5 | 43.5 |
| | | DEG | | 18.5 | 18.3 | 18.5 | 18.0 | 18.3 | 18.5 | 18.5 |
| | | CHDM | | — | — | — | — | — | — | — |
| | | PEG #1000 | | — | — | — | — | — | — | — |
| | Sulfur element content per mole of dihydroxy compounds (A) | | mmol | 21.4 | 21.5 | 21.4 | 21.4 | 21.4 | 21.4 | 21.4 |
| | Metal element content per mole of dihydroxy compounds | Sum of Group-1 metals and Group-2 metals (B) | | 7.0 | 6.9 | 7.1 | 7.1 | 7.5 | 7.3 | 11.3 |
| | | Lithium and Group-2 metals | | 6.2 | 6.0 | 6.3 | 6.3 | 0.7 | 0.8 | 10.5 |
| | | Na, K, Cs | | 0.8 | 0.9 | 0.8 | 0.8 | 6.8 | 6.5 | 0.8 |
| | | B/A | | 0.3 | 0.3 | 0.3 | 0.3 | 0.4 | 0.3 | 0.5 |
| | Phenol content | | weight ppm | 683 | 645 | 650 | 579 | 598 | 606 | 2093 |
| | DPC content | | weight ppm | 70 | 47 | 76 | 57 | 73 | 67 | 218 |
| Resin properties | Reduced viscosity | | dL/g | 0.379 | 0.380 | 0.383 | 0.380 | 0.377 | 0.385 | 0.391 |
| | Glass transition temperature | | ° C. | 128 | 127 | 127 | 128 | 128 | 127 | 128 |
| | Pellet YI | | — | 25.8 | 23.5 | 23.4 | 26.0 | 31.3 | 37.4 | 23.0 |
| | Heat aging test ΔYI | | — | 4.5 | 4.2 | 4.4 | 4.7 | 7.3 | 8.5 | 5.7 |

TABLE 4

Properties of polycarbonate resins and results of evaluation

| | | | | Example 3-6 | Example 3-11 | Example 3-12 | Example 3-7 | Example 3-8 | Comparative Example 3-5 | Comparative Example 3-6 |
|---|---|---|---|---|---|---|---|---|---|---|
| Kind of catalyst metal | | | | Ca | Na | Ca | Ca | Mg | Na | Na |
| Poly- | Proportion of | BHEPF | mol % | 40.2 | 40.0 | 40.0 | 33.0 | 44.5 | 100.0 | — |

TABLE 4-continued

Properties of polycarbonate resins and results of evaluation

| | | | | Example 3-6 | Example 3-11 | Example 3-12 | Example 3-7 | Example 3-8 | Comparative Example 3-5 | Comparative Example 3-6 |
|---|---|---|---|---|---|---|---|---|---|---|
| carbonate resin | structural units derived from dihydroxy compound | ISB | | 59.8 | 60.0 | 60.0 | 33.8 | 55.2 | — | 100.0 |
| | | DEG | | — | — | — | — | — | — | — |
| | | CHDM | | — | — | — | 33.2 | — | — | — |
| | | PEG #1000 | | — | — | — | — | 0.3 | — | — |
| | Sulfur element content per mole of dihydroxy compounds (A) | | mmol | 22.6 | 22.5 | 55.4 | 18.5 | 25.0 | 56.2 | — |
| | Metal element content per mole of dihydroxy compounds | Sum of Group-1 metals and Group-2 metals (B) | | 9.2 | 9.7 | 21.9 | 7.0 | 13.1 | 31.2 | 2.9 |
| | | Lithium and Group-2 metals | | 8.2 | 0.8 | 20.8 | 6.2 | 12.5 | 0.5 | 0.7 |
| | | Na, K, Cs | | 1.0 | 8.9 | 1.1 | 0.8 | 0.6 | 30.7 | 2.2 |
| | B/A | | | 0.4 | 0.4 | 0.4 | 0.4 | 0.5 | 0.6 | — |
| | Phenol content | | weight ppm | 655 | 633 | 521 | 580 | 550 | 568 | 1543 |
| | DPC content | | weight ppm | 66 | 69 | 68 | 51 | 35 | 76 | 56 |
| Resin properties | Reduced viscosity | | dL/g | 0.368 | 0.358 | 0.390 | 0.428 | 0.352 | 0.353 | 0.450 |
| | Glass transition temperature | | °C. | 148 | 148 | 149 | 126 | 145 | 155 | 160 |
| | Pellet YI | | — | 24.8 | 29.3 | 30.1 | 20.2 | 26.4 | 8.5 | 15.7 |
| | Heat aging test ΔYI | | — | 4.5 | 6.5 | 7.8 | 3.5 | 4.3 | 3.2 | 1.2 |

TABLE 5

| | | | | Example 3-3 | Example 3-6 | Example 3-7 | Example 3-8 | Comparative Example 3-5 | Comparative Example 3-6 |
|---|---|---|---|---|---|---|---|---|---|
| Polycarbonate resin | Proportion of structural units derived from dihydroxy compound | BHEPF | mol % | 38.0 | 40.2 | 33.0 | 44.5 | 100.0 | — |
| | | ISB | | 43.5 | 59.8 | 33.8 | 55.2 | — | 100.0 |
| | | DEG | | 18.5 | — | — | — | — | — |
| | | CHDM | | — | — | 33.2 | — | — | — |
| | | PEG #1000 | | — | — | — | 0.3 | — | — |
| Optical properties | Reduced viscosity | | dL/g | 0.383 | 0.368 | 0.428 | 0.352 | 0.353 | 0.450 |
| | Glass transition temperature | | °C. | 127 | 148 | 126 | 145 | 155 | 160 |
| | Photoelastic coefficient | | ×10$^{-12}$ Pa$^{-1}$ | 29 | 28 | 30 | 28 | 32 | 11 |
| | Re450/Re550 | | — | — | 0.90 | 0.91 | 0.95 | 0.88 | 1.30 | 1.03 |

While the invention has been described in detail and with reference to specific embodiments thereof, it will be apparent to one skilled in the art that various changes and modifications can be made therein without departing from the spirit and scope thereof. This application is based on a Japanese patent application filed on May 27, 2010 (Application No. 2010-121982), the contents thereof being incorporated herein by reference.

INDUSTRIAL APPLICABILITY

The polycarbonate resin of the invention is excellent in terms of optical properties, hue, and thermal stability. It is possible to provide a polycarbonate resin which is applicable to a wide range of fields including the field of injection molding for producing electrical/electronic parts, automotive parts, and the like, the field of films and sheets, the fields of bottles and containers, lens applications such as camera lenses, finder lenses, and lenses for CCDs or CMOSs, films or sheets for use in liquid-crystal or plasma displays or the like, such as retardation films, diffusion sheets, and polarizing films, optical disks, optical materials, optical parts, and binder applications for fixing pigments, charge transfer agents, or the like.

The invention claimed is:

1. A polycarbonate resin which has a glass transition temperature of 110-150° C. and a reduced viscosity, as measured at 20° C. with respect to the methylene chloride solution having a concentration of 0.6 g/dL, of 0.30-0.46, and which, when being molded, gives a film wherein the ratio (Re450/Re550) of the retardation thereof measured at a wavelength of 450 nm (Re450) to the retardation thereof measured at a wavelength of 550 nm (Re550) is 0.50-0.93.

2. The polycarbonate resin according to claim 1 wherein the ratio (Re450/Re550) of the retardation of the film of the polycarbonate resin measured at a wavelength of 450 nm (Re450) to the retardation thereof measured at a wavelength of 550 nm (Re550) is 0.50-0.90.

3. The polycarbonate resin according to claim 1 which has a melt viscosity, as measured at a temperature of 240° C. and a shear rate of 91.2 sec$^{-1}$, of 1,500-3,500 Pa·s.

4. The polycarbonate resin according to claim 1 which has a photoelastic coefficient of 40×10$^{-12}$ Pa$^{-1}$ or less.

5. The polycarbonate resin according to claim 1 which has a birefringence of 0.001 or higher when stretched in a stretch ratio of 2.0 by fixed-end stretching under the conditions of a temperature which is higher by 15° C. than the glass transition temperature of the polycarbonate resin.

6. The polycarbonate resin according to claim 1 which contains a structural unit derived from a dihydroxy compound represented by the following formula (1)

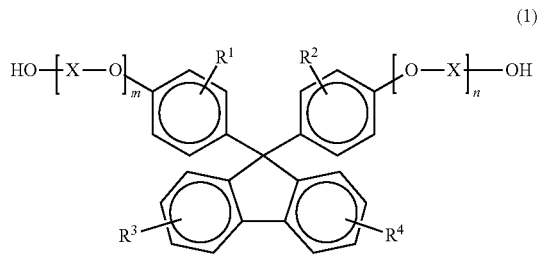

wherein In the formula (1), $R^1$ to $R^4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, $R^1$ to $R^4$ being the same or different atoms or groups respectively as the four substituents bonded to the respective benzene rings; X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms; and m and n each independently are an integer of 0-5.

7. The polycarbonate resin according to claim 6 which is a polycarbonate resin that contains a structural unit derived from a dihydroxy compound represented by the formula (1) and in which the total content of compounds represented by the following formula (2) is up to 400 ppm of the dihydroxy compound

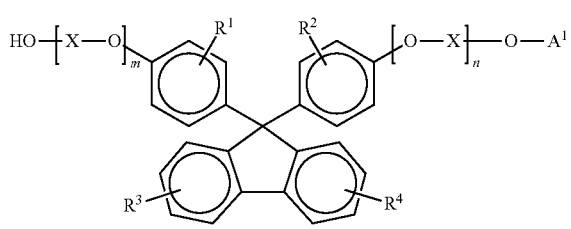

wherein In the formula (2), $R^1$ to $R^4$, X, m, and n are the same as in the formula (1), and $A^1$ represents an optionally substituted aliphatic group having 1-18 carbon atoms or an optionally substituted aromatic group having 6-18 carbon atoms.

8. The polycarbonate resin according to claim 6 which contains a structural unit derived from a dihydroxy compound having the portion represented by the following formula (3) as part of the structure thereof, besides a structural unit derived from the dihydroxy compound represented by the formula (1)

wherein the case where the portion represented by the formula (3) is a portion which constitutes part of —CH$_2$—OH is excluded.

9. The polycarbonate resin according to claim 8 wherein the dihydroxy compound having the portion represented by the formula (3) is a compound which has both a cyclic structure and an ether structure.

10. The polycarbonate resin according to claim 8 wherein the dihydroxy compound having the portion represented by the formula (3) as part of the structure thereof is a dihydroxy compound represented by the following formula (4)

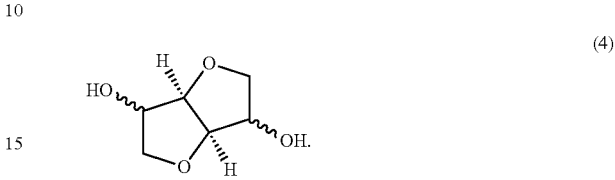

11. The polycarbonate resin according to claim 1 which contains a carbonic diester represented by the following formula (5) in an amount of 80 weight ppm or less

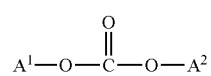

wherein the formula (5), $A^1$ and $A^2$ each independently represent an optionally substituted aliphatic group having 1-18 carbon atoms or an optionally substituted aromatic group having 6-18 carbon atoms, and $A^1$ and $A^2$ may be the same or different.

12. The polycarbonate resin according to claim 1 which contains an aromatic monohydroxy compound in an amount of 700 weight ppm or less.

13. The polycarbonate resin according to claim 6 wherein the total content of sodium, potassium, and cesium in the polycarbonate resin is 1 μmol or less per mole of the structural units each derived from a dihydroxy compound which constitute the polycarbonate resin.

14. The polycarbonate resin according to claim 6 wherein when the total sulfur element content per mole of the structural units each derived from a dihydroxy compound which constitute the polycarbonate resin, in the polycarbonate resin, is expressed by A [μmol] and the total content of the Group-1 metallic elements and Group-2 metallic elements of the long-form periodic table per mole of the structural units each derived from a dihydroxy compound which constitute the polycarbonate resin, in the polycarbonate resin, is expressed by B [μmol], then the ratio of B to A (B/A) is 2 or less.

15. The polycarbonate resin according to claim 7 wherein when the total content of compounds represented by the formula (2) based on the structural units derived from a dihydroxy compound represented by the formula (1), in the polycarbonate resin, is expressed by a [ppm] and the total amount of the Group-1 metals and Group-2 metals of the long-form periodic table which are contained in the polycarbonate per mole of the structural units derived from a dihydroxy compound represented by the formula (1), in the polycarbonate, is expressed by b [μmol], then the proportion of a to b (a/b) is 20 or less.

16. The polycarbonate resin according to claim 6 which contains one or more compounds of at least one metal selected from the group consisting of lithium and the Group-2 metals of the long-form periodic table, the amount of the compounds being 0.5-50 μmol per mole of the structural units which are derived from a dihydroxy compound represented by the formula (1) and are contained in the polycarbonate resin.

17. The polycarbonate resin according to claim 1, further containing a constituent unit derived from at least one compound selected from the group consisting of aliphatic dihydroxy compounds, alicyclic dihydroxy compounds, oxyalkylene glycols, and diols having a cyclic acetal structure.

18. The polycarbonate resin according to claim 11 which has been obtained by subjecting one or more dihydroxy compounds comprising a dihydroxy compound represented by the formula (1) to melt polycondensation with a carbonic diester represented by the formula (5).

19. The polycarbonate resin according to claim 6 wherein the dihydroxy compounds from which the structural units that constitute the polycarbonate resin are derived each are a dihydroxy compound which has a boiling point at 5 kPa of 200° C. or higher.

20. A polycarbonate resin obtained by subjecting a dihydroxy-compound mixture comprising a dihydroxy compound represented by the following formula (1) and a dihydroxy compound having the portion represented by the following formula (3) as part of the structure thereof to polycondensation with a carbonic diester represented by the following formula (5) in the presence of a catalyst, wherein the catalyst comprises one or more compounds which contain at least one metal selected from the group consisting of lithium and the Group-2 metals of the long-form periodic table, and that the total content of the Group-1 metallic elements and Group-2 metallic elements of the long-form periodic table, in the polycarbonate resin, is 20 μmol or less per mole of the structural units each derived from a dihydroxy compound which constitute the polycarbonate resin

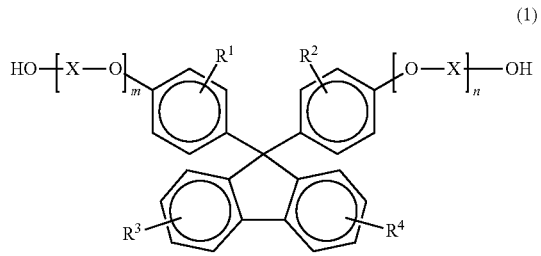
(1)

wherein the formula (1), $R^1$ to $R^4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, $R^1$ to $R^4$ being the same or different atoms or groups respectively as the four substituents bonded to the respective benzene rings; X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms; and m and n each independently are an integer of 0-5

(3)

wherein the case where the portion represented by the formula (3) is a portion which constitutes part of —$CH_2$—OH is excluded

(5)

wherein the formula (5), $A^1$ and $A^2$ each independently represent an optionally substituted aliphatic group having 1-18 carbon atoms or an optionally substituted aromatic group having 6-18 carbon atoms, and $A^1$ and $A^2$ may be the same or different.

21. A transparent film formed from the polycarbonate resin according to claim 1.

22. The film according to claim 21 which is a film obtained by stretching the transparent film at least unidirectionally.

23. The film according to claim 21 wherein the ratio (Re450/Re550) of the retardation thereof measured at a wavelength of 450 nm (Re450) to the retardation thereof measured at a wavelength of 550 nm (Re550) is 0.5-0.93.

24. The film according to claim 21 wherein the ratio (Re450/Re550) of the retardation thereof measured at a wavelength of 450 nm (Re450) to the retardation thereof measured at a wavelength of 550 nm (Re550) is 0.5-0.90.

25. The film according to claim 21 which has a photoelastic coefficient of $40 \times 10^{-12}$ $Pa^{-1}$ or less.

26. A transparent film formed from the polycarbonate resin according to claim 20.

27. The film according to claim 26 which is a film obtained by stretching the transparent film at least unidirectionally.

28. The film according to claim 26 wherein the ratio (Re450/Re550) of the retardation thereof measured at a wavelength of 450 nm (Re450) to the retardation thereof measured at a wavelength of 550 nm (Re550) is 0.5-0.93.

29. The film according to claim 26 wherein the ratio (Re450/Re550) of the retardation thereof measured at a wavelength of 450 nm (Re450) to the retardation thereof measured at a wavelength of 550 nm (Re550) is 0.5-0.90.

30. The film according to claim 26 which has a photoelastic coefficient of $40 \times 10^{-12}$ $Pa^{-1}$ or less.

* * * * *